(12) United States Patent  (10) Patent No.: US 6,739,774 B1
Lahr  (45) Date of Patent: May 25, 2004

(54) EXPANDABLE AND CONTRACTIBLE KEYBOARD WITH ADJUSTABLE KEY SIZES

(75) Inventor: Roy J. Lahr, Los Angeles, CA (US)

(73) Assignee: Rast Associates, LLC, Long Beach, CA (US)

( * ) Notice: Subject to any disclaimer, the term of this patent is extended or adjusted under 35 U.S.C. 154(b) by 0 days.

(21) Appl. No.: 09/558,866

(22) Filed: Apr. 26, 2000

Related U.S. Application Data

(60) Provisional application No. 60/178,936, filed on Feb. 1, 2000.

(51) Int. Cl.[7] .................................................. B41J 5/16
(52) U.S. Cl. ....................................... 400/495; 400/472
(58) Field of Search ................................ 400/472, 495, 400/496, 492; 341/22, 21; 361/680; D14/114, 115

(56) References Cited

U.S. PATENT DOCUMENTS

| | | |
|---|---|---|
| 3,940,758 A | 2/1976 | Margolin |
| 4,597,681 A | 7/1986 | Hodges ........................ 400/488 |
| 4,661,005 A | 4/1987 | Lahr ........................... 400/489 |
| 4,677,600 A | 6/1987 | Yoshida |
| 5,044,798 A | 9/1991 | Roylance et al. |
| 5,141,343 A | 8/1992 | Roylance et al. ........... 400/472 |
| 5,163,765 A | 11/1992 | Levy ........................... 400/492 |
| 5,187,644 A | 2/1993 | Crisan ......................... 361/393 |
| 5,212,473 A | 5/1993 | Louis |
| 5,220,521 A | 6/1993 | Kikinis |
| 5,519,569 A | 5/1996 | Sellers ........................ 361/680 |
| 5,575,576 A | 11/1996 | Roysden |
| 5,590,020 A | 12/1996 | Sellers ........................ 361/680 |
| 5,590,382 A | 12/1996 | Kikinis et al. .............. 395/393 |
| 5,742,241 A | 4/1998 | Crowley et al. |
| 5,743,666 A | 4/1998 | VanZeeland et al. ........ 400/485 |
| 5,870,034 A | 2/1999 | Wood .......................... 341/22 |
| 5,938,353 A | 8/1999 | Butler ......................... 400/492 |
| 5,951,178 A | 9/1999 | Lim ............................ 400/472 |
| 5,982,612 A | * 11/1999 | Roylance .................... 361/680 |
| 6,019,530 A | 2/2000 | Lanzetta et al. |
| 6,036,093 A | * 3/2000 | Schultz .................. 235/462.44 |
| 6,056,456 A | 5/2000 | Kinoshita |
| 6,059,470 A | 5/2000 | Myint |
| 6,068,417 A | 5/2000 | Butler |
| 6,087,966 A | 7/2000 | Sato |
| 6,092,944 A | 7/2000 | Butler |
| 6,152,627 A | 11/2000 | Watanabe et al. |
| 6,174,097 B1 | * 1/2001 | Daniel ......................... 400/492 |
| 6,257,782 B1 | 7/2001 | Maruyama et al. |
| 2001/0003450 A1 | 6/2001 | Hemia et al. |
| 2001/0012195 A1 | 8/2001 | Lefort |

FOREIGN PATENT DOCUMENTS

JP  04006721 A * 1/1992 .......... H01H/13/70

* cited by examiner

Primary Examiner—Anthony H. Nguyen
(74) Attorney, Agent, or Firm—Kenyon & Kenyon

(57) ABSTRACT

A keyboard which may be utilized in either an expanded or contracted state. A keyboard is comprised of an expandable and compressible housing which supports a plurality of elastic belts. Keyswitch assemblies are fastened to the elastic belt. When the keyboard housing is expanded, the elastic belts are stretched, and the distance between the keys is increased. The keytops can be of variable size so that upon expansion, they increase in size.

103 Claims, 19 Drawing Sheets

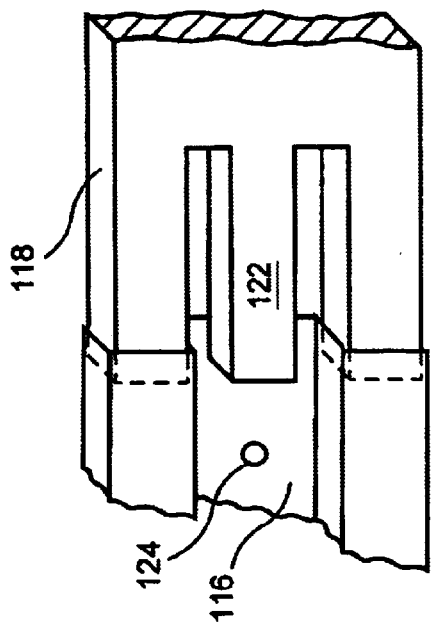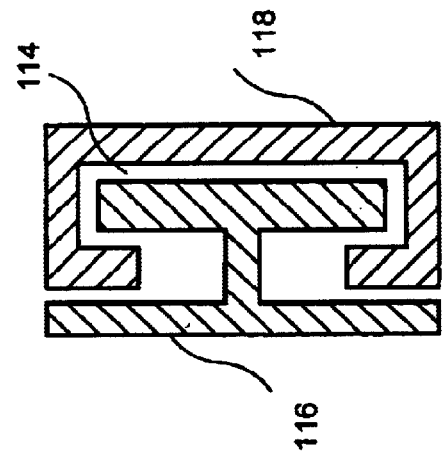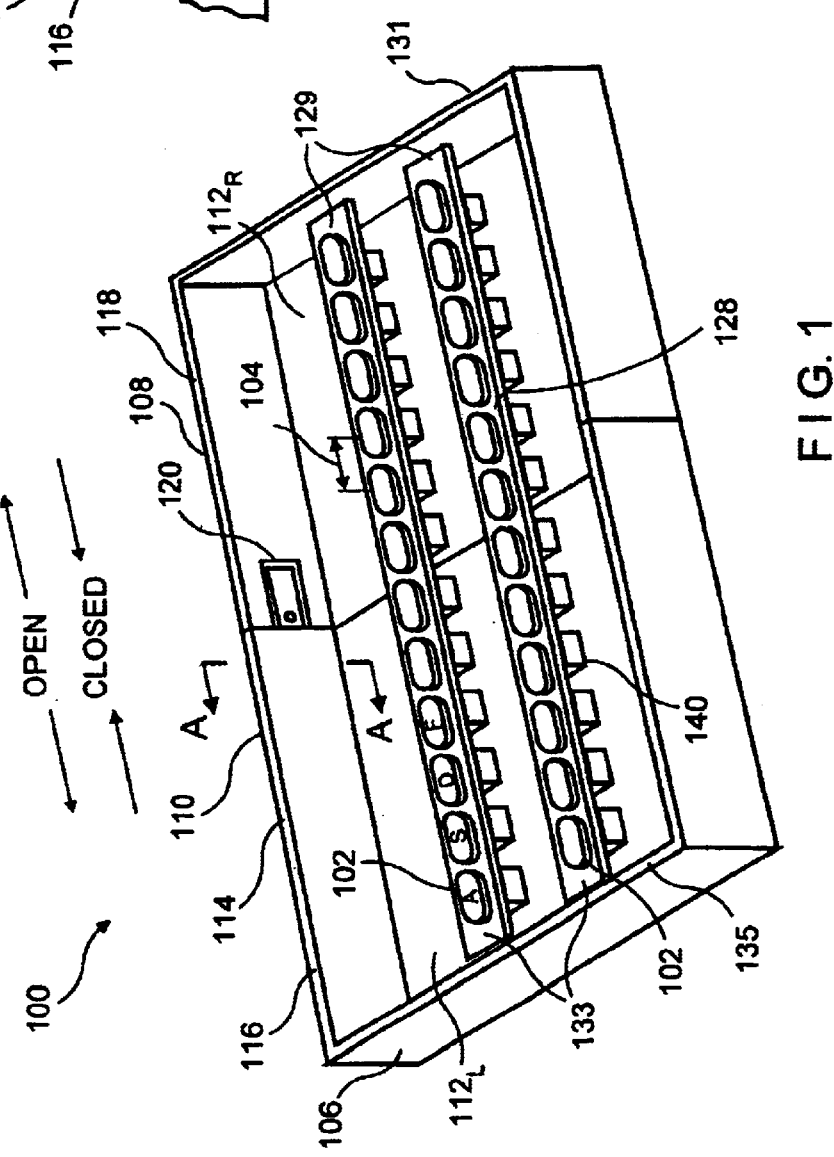

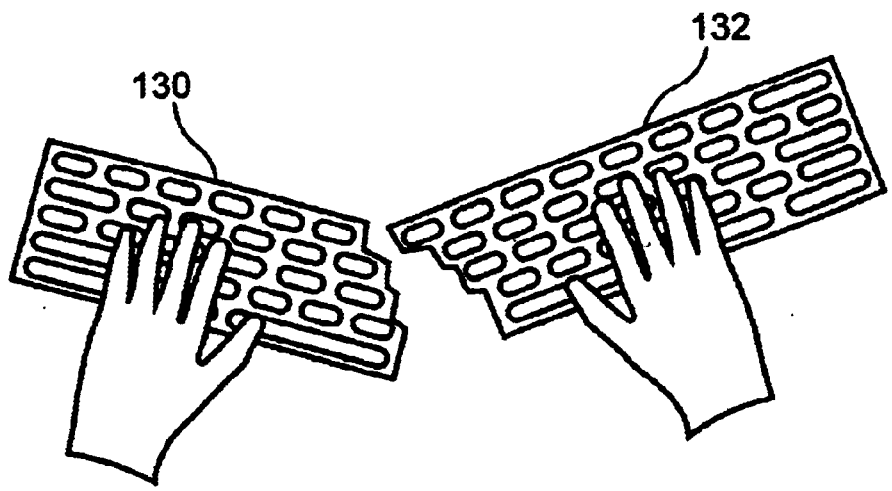
F I G. 4
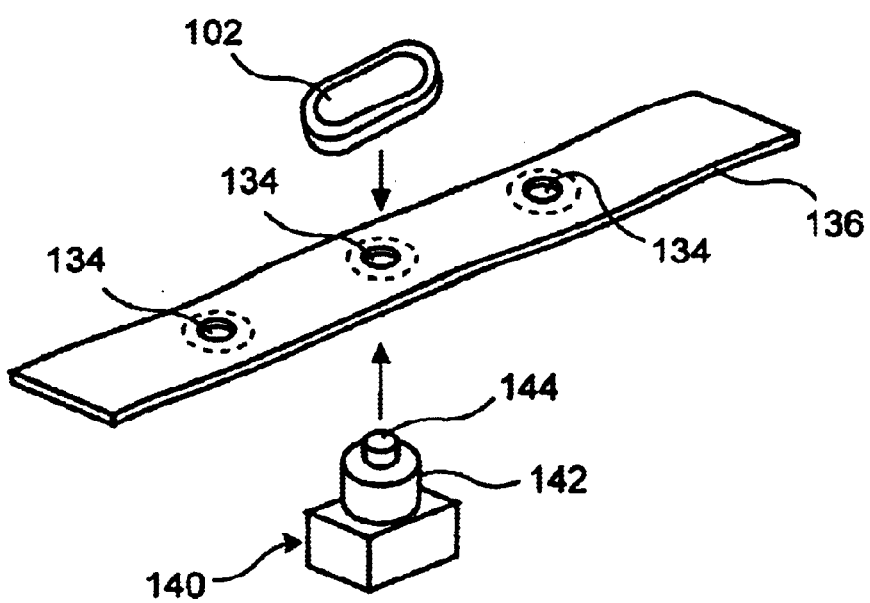
F I G. 5

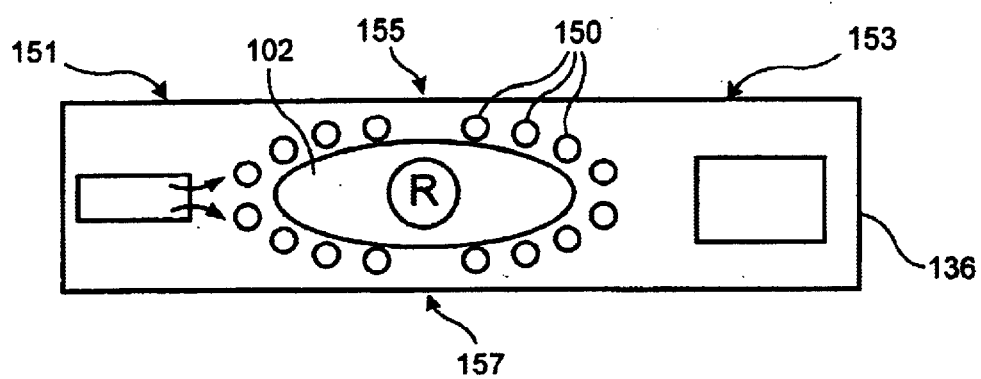
F I G. 8
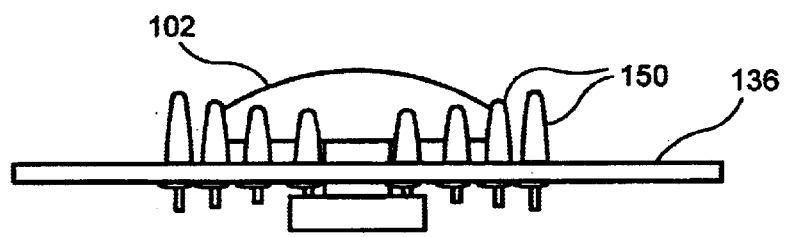
F I G. 9
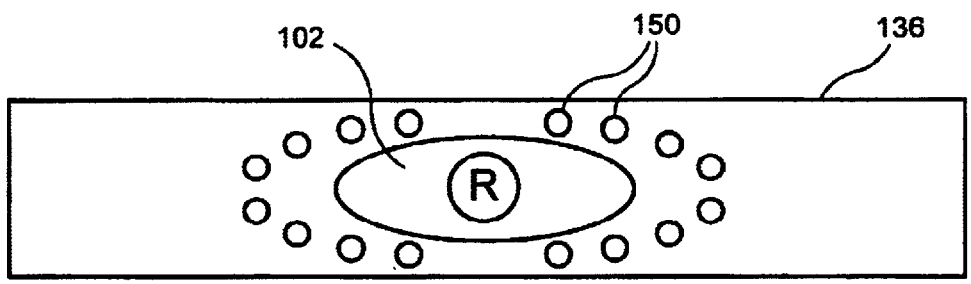
F I G. 10
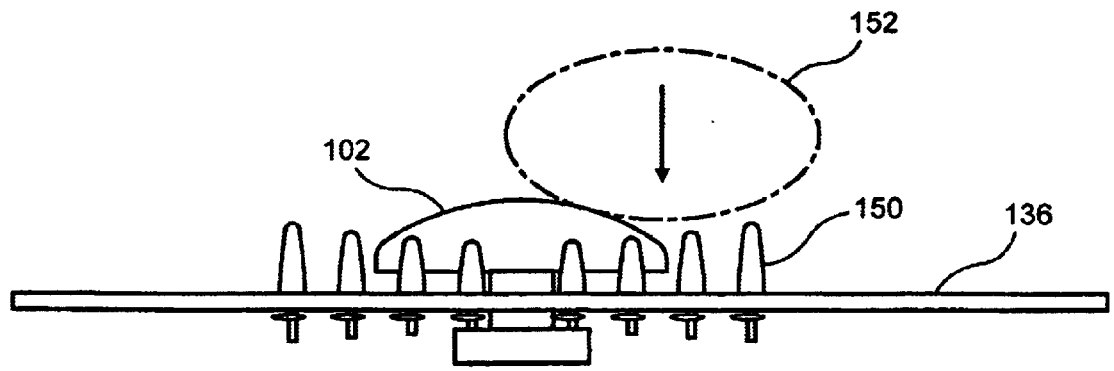
F I G. 11

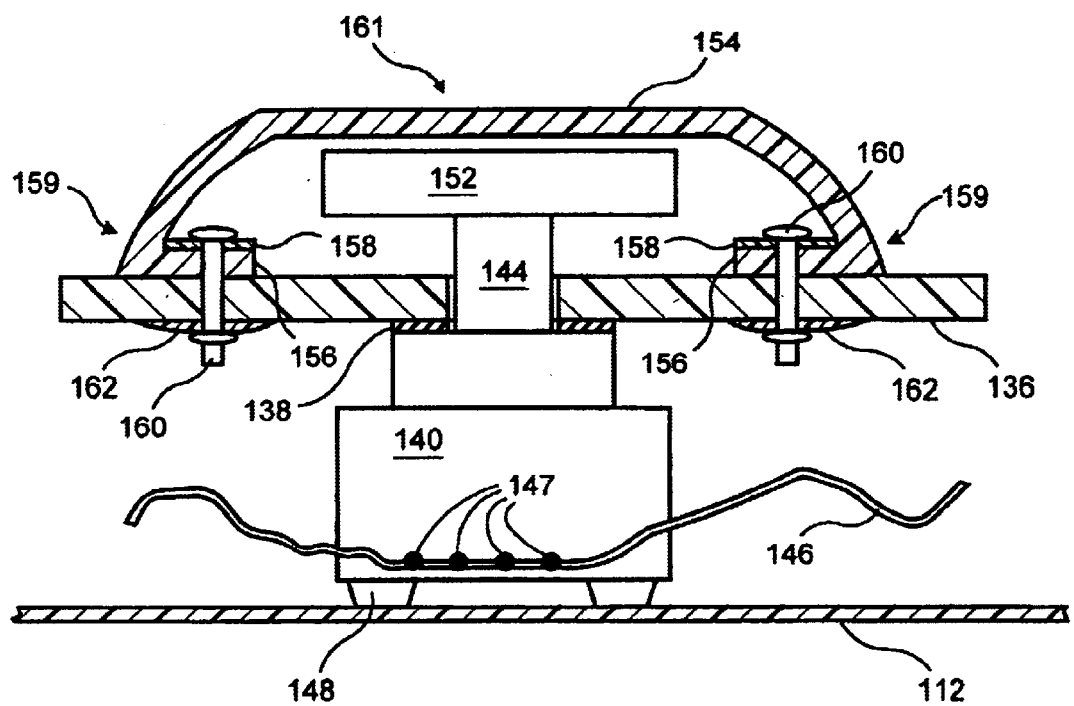
F I G. 12
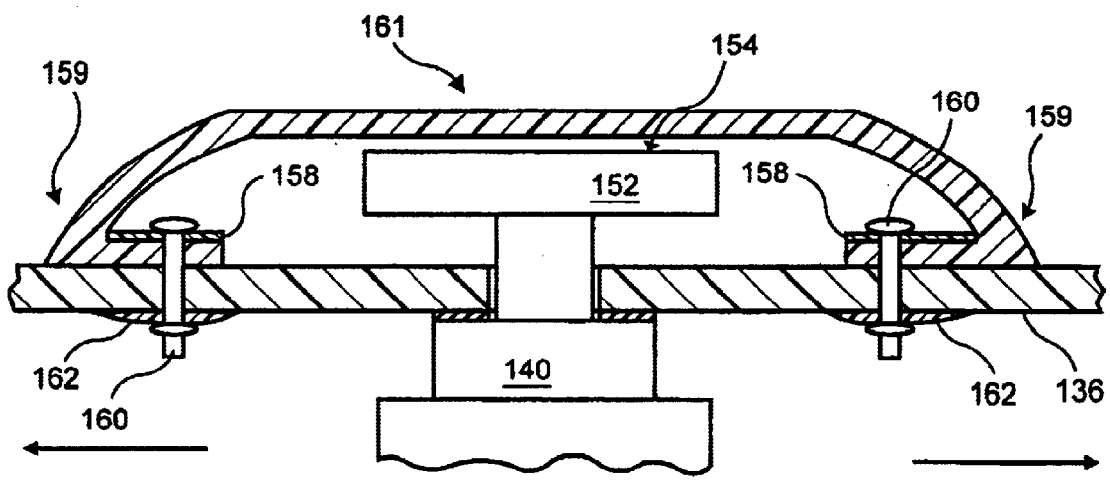
F I G. 13

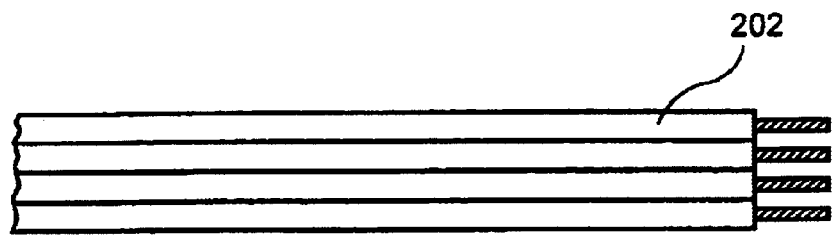
F I G. 34a
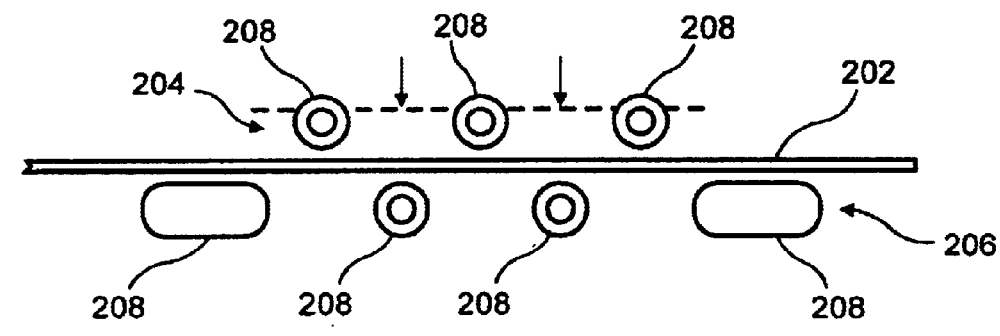
F I G. 34b
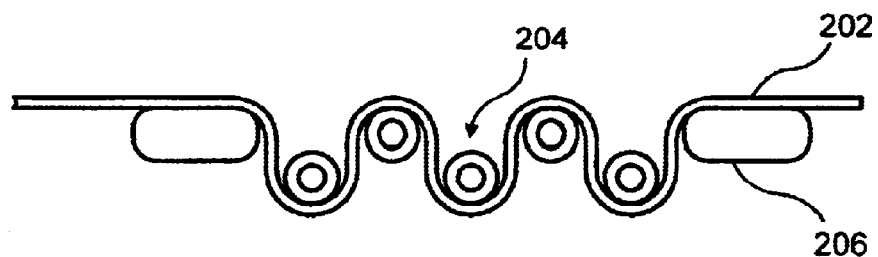
F I G. 34c
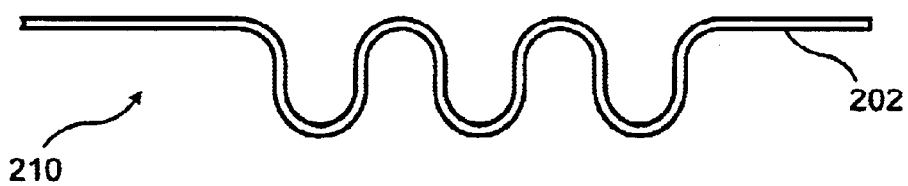
F I G. 34d

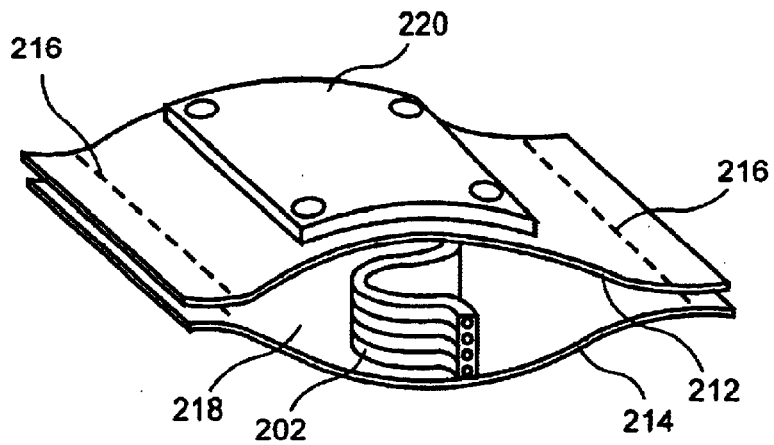
F I G. 35
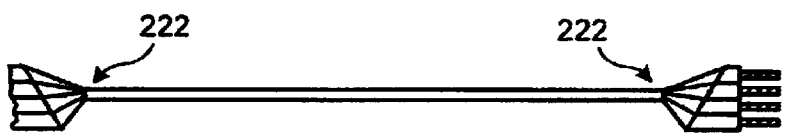
F I G. 36
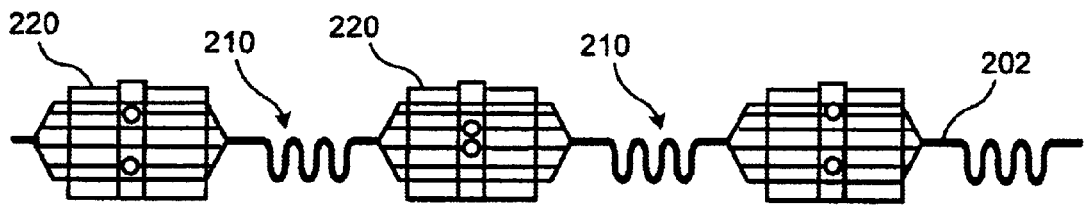
F I G. 37
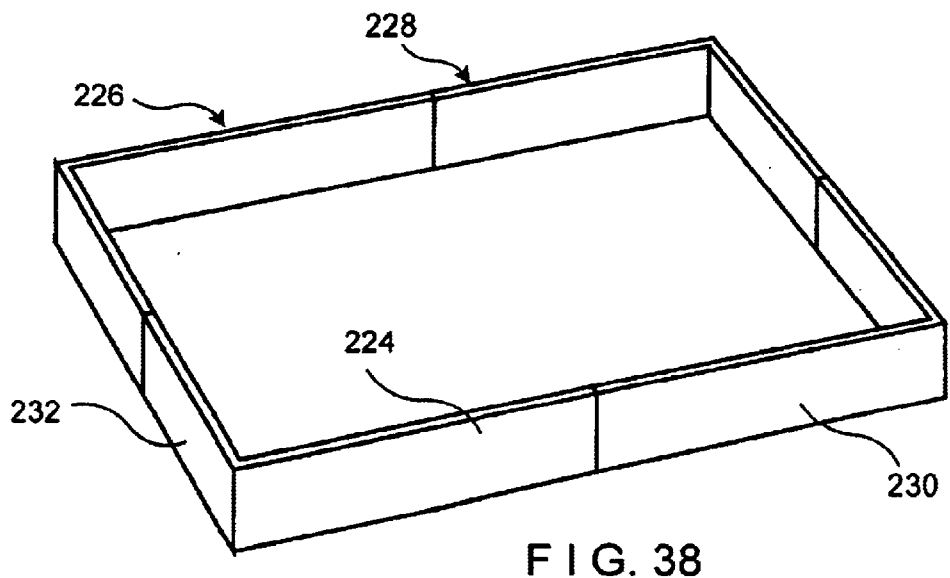
F I G. 38

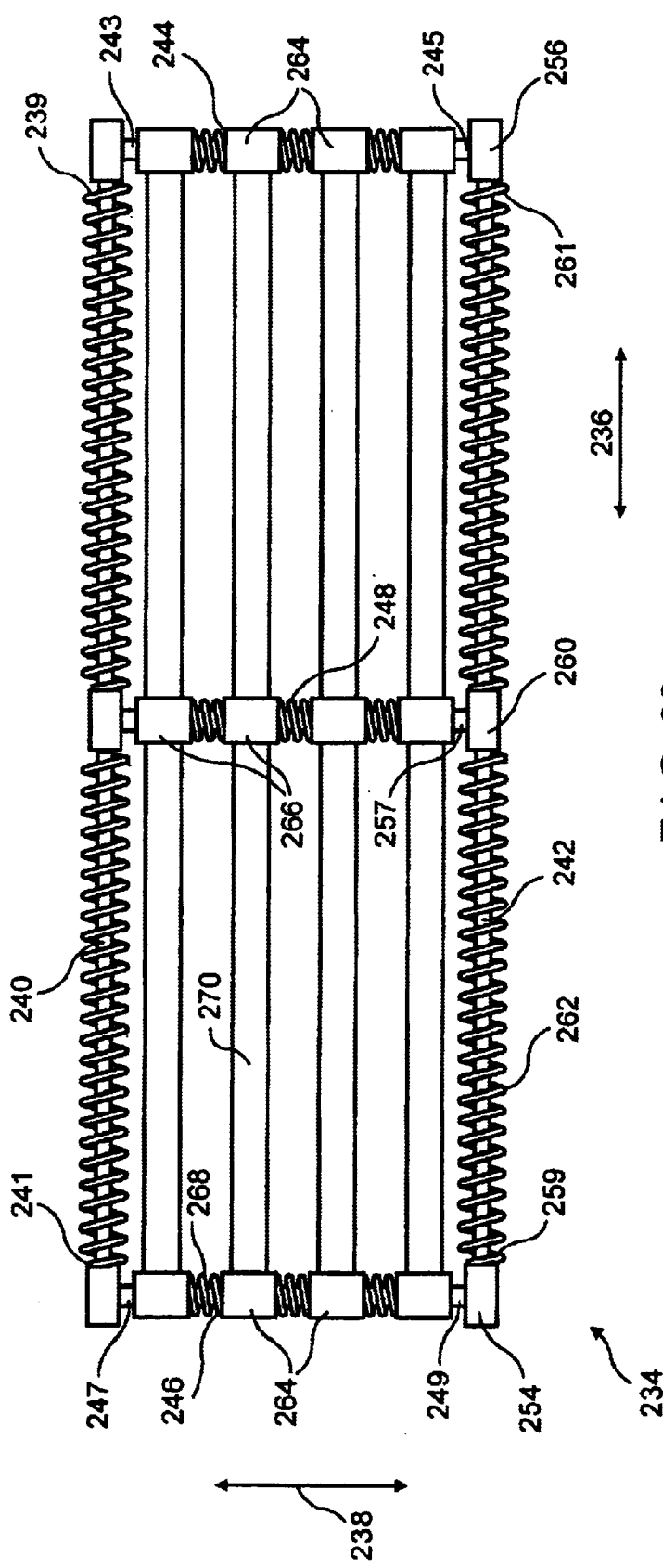
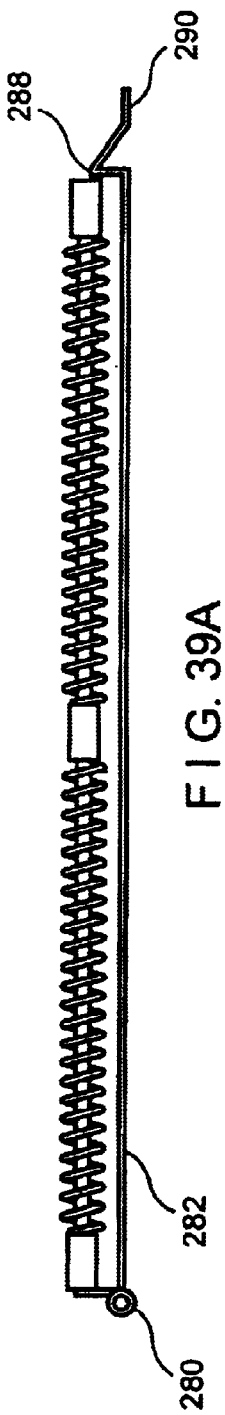
FIG. 39
FIG. 39A

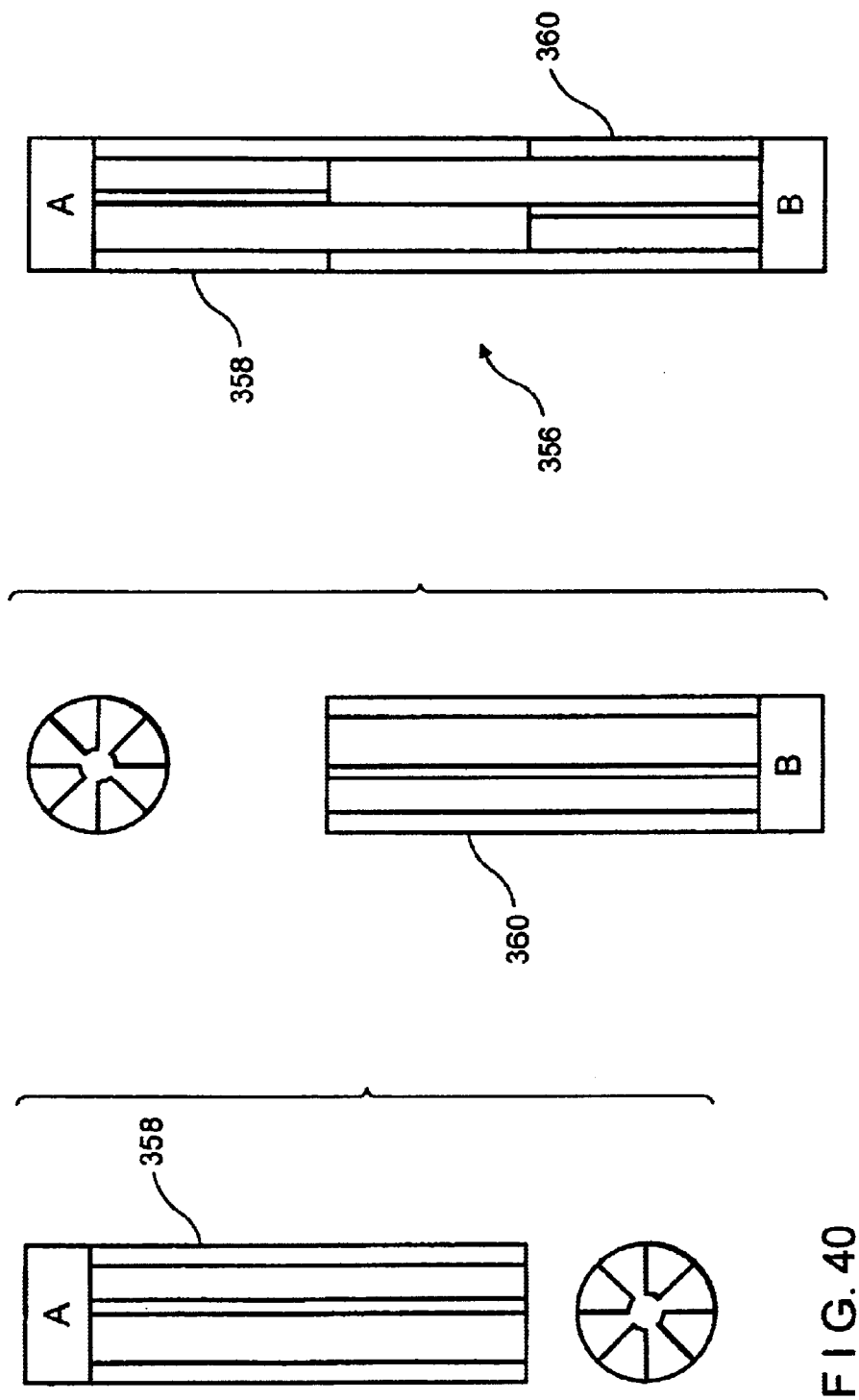

EXPANDABLE AND CONTRACTIBLE KEYBOARD WITH ADJUSTABLE KEY SIZES

ROSS-REFERENCE TO RELATED APPLICATIONS

This application claims the benefit of U.S. Provisional Patent Application Serial No. 60/178,936, filed on Feb. 1, 2000.

BACKGROUND OF THE INVENTION

1. Field of the Invention

The present invention relates to a keyboard apparatus. In particular, the present invention relates to a keyboard which can be adjusted to vary the size of the keyboard, the spacing between the keys, and the size of the keys of the keyboard.

2. Description of the Prior Art

For the input of information into computer based equipment (with word processing as a prominent example), typing remains the dominant mode of translating the brain's perception of the desired textual information into a processable data stream of digital information. While touch typing using all of the fingers is the fastest and most often used input system, many information system users successfully input information using only one or two fingers.

Speech recognition systems are becoming more usable, but depend on having a great deal of computer information processing power available to interpret the spoken word and recognize the probable written word form that the sounds represent. Powerful full size laptop or desktop computers are needed to provide the signal processing capability required for even moderately accurate voice recognition. At this time, the voice recognition system must be trained to recognize the voice pattern for a particular speaker, generally using standardized text materials which the prospective speech recognition user must vocalize in training sessions.

Noise cancellation microphones, correctly placed near the mouth are generally needed to improve the quality of the voice signal that serves as input to the speech recognition system so as to avoid recognition mistakes. The user must usually have a nearby keyboard available to reinstruct or correct the voice recognition system when errors in recognition occur, or if new, possibly complex, words are to be added to the speech recognition library.

Thus, for the near term future, touch typing, using all fingers or just one or two, will remain the most common information input system.

As the use of the internet for email messages or information browsing grows and computer technology provides sufficient information processing power for devices smaller than a standard laptop computer, the desire to use small portable "palm-top" information handling devices for messaging grows very rapidly. Most of these small portable information handling devices use a miniature "QWERTY" alphanumeric keyboard. For information retrieval and entry, the user must use the eraser end of a pencil or a carefully placed fingertip to correctly actuate the very small key button tops.

While the small keyboards on portable devices can be used to enter information, most people do not find it convenient to put in messages of over one paragraph by pressing the tiny key buttons. Thus, there is a need to make the tiny keyboards "grow" in size to accommodate easy finger typing, and hopefully, even "touch typing". There are alternative input systems to keyboards, such as the use of a stylus to write on a "touch screen", but thus far, the handwriting or stroke input recognition systems are somewhat inaccurate or slow, so that again, only brief message inputs are practical.

Proposals for compressing and then growing a keyboard in size have previously been made. U.S. Pat. No. 5,141,343 to Roylance et al. teaches a physically expansible/compressible keyboard. That patent discloses key buttons which are the same size as key buttons on a full-size keyboard in which the pitch spacing (center to center dimension between adjacent keys) is variable. Thus Roylance teaches tight packing of the keyboards during device transport, opening out to a usable keyboard during use. The use of key buttons that are the same size as full size key buttons on a standard keyboard limits the size compression. Therefore, the Roylance keyboard is not well suited for really small, fully portable handheld devices, such as those that are markedly smaller than a standard laptop computer. Furthermore, the Roylance device uses a complicated mechanical apparatus to move the keys, increasing manufacturing difficulty and cost.

U.S. Pat. No. 3,940,758 to Margolis discloses a keyboard with several hinged sections. The hinged sections are folded for transport and unfolded for use. While this does achieve a compact transportable device, the stacked sections do not allow the user to have access to the keyboard when compressed. For many short transactions, it is preferable for the user to do single keystroke data input on the fully compressed keyboard, and only expand the keyboard to a larger size when longer data input is required. This function allows the device user to conveniently operate the device in crowded situations, such as in a telephone booth, or during a ride on a bus, taxi, train, plane or commuter van. When the rider reaches the destination, the device can then be expanded for typing convenience during longer data input sessions. For even more convenience, the ultra miniature keyboard, when in expanded mode, may split into two portions and provide fixed or variable angulation, as described in U.S. Pat. No. 4,661,005 to Lahr. The splitting reduces the need for wrist pronation or other "contortions" to use a small size keyboard.

U. S. Pat. No. 5,938,353 to Butler presents the use of key tops which have only one size, but have serrated edges which can interlock together to provide compression in size during compacted form, and teaches the use of handles and detents to aid opening and closing of the serrated key button keyboards between their compacted and expanded sizes. Single section key buttons are a limiting design factor in how compact the keyboard can be made in its compressed state. Multi-section key buttons provide more design flexibility and potentially more potential compression compared to the expanded format keyboard. Also, when the serrated edge key buttons are placed in their compacted form, it may be more difficult to use them "as is" to perform limited data input. Ideally, the user should be able to choose which keyboard mode to use: compacted for ease of travel with no "changeover" efforts for limited data entry, or expanded, for ease in typing of longer documents.

Other means of providing a more convenient keyboard format for longer typing sessions include attaching either a single large keyboard to the smaller data handling device, or in some cases, providing an external two or three section keyboard which can be compacted to make the transport size smaller. Again, these devices do not provide the user with the combination use of a smaller keyboard format for quick typing input, and a larger format for longer typing sessions.

Thus, what is needed is a miniature keyboard in which the key button size as well as the keybutton pitch—i.e. distance between the keys —can grow. The user can utilize "one key at a time" data input operation when the miniature keyboard is compacted to its smallest size, but has the option of physically expanding the keyboard to achieve "touch typing" ease when working with longer data documents. By compacting the key button size as well as the pitch, it is possible to achieve a tiny keyboard for portability, but retain the dual input mode options: (1) one-a-time pressing of the compacted key buttons for limited data input or (2) expansion to a nearly full sized keyboard for more convenient input of longer information segments by touch typing as for creating a one or two page email message for transmission.

SUMMARY OF THE INVENTION

In accordance with the invention, a keyboard with a housing which may be extended from a contracted to an expanded state is provided. A plurality of elastic belts is attached to the housing, and key switch assemblies are fastened to the elastic belt. When the housing is extended, the elastic belts stretch. Correspondingly, the key switch assemblies move apart, thereby increasing the key pitch and providing an expandable keyboard.

In another embodiment, expandable keytops are mounted to the elastic belt. When the keytops are pressed, they activate the key switch assemblies. The keytops may be made of an expandable material so that they expand and contract as the elastic belt expands and contracts.

Further objectives and advantages of the subject invention will be apparent to those skilled in the art from the detailed description of the disclosed invention.

BRIEF DESCRIPTION OF THE DRAWINGS

FIG. 1 shows a partial perspective view of a keyboard of the present invention.

FIG. 2 shows a cross-section through line A—A of FIG. 1.

FIG. 3 shows a locking latch utilized in the present invention.

FIG. 4 shows a top view of one embodiment the keyboard of present invention that allows the halves of the key board to be adjusted.

FIG. 5 shows the attachment of a keyswitch assembly to an elastic belt.

FIG. 8 shows a top view of an embodiment of the present invention which utilizes applique studs in the contracted state.

FIG. 9 shows a side view of an embodiment of the present invention which utilizes applique studs in the contracted state.

FIG. 10 shows a top view of an embodiment of the present invention which utilizes applique studs in the expanded state.

FIG. 11 shows a side view of an embodiment of the present invention which utilizes applique studs in the expanded state.

FIGS. 12 shows a cross-section of a keyswitch assembly which utilizes a foamed plastic rubber overcap keytop in a contracted state.

FIG. 13 shows a cross-section of a keyswitch assembly which utilizes a foam overcap keytop in an expanded state.

FIGS. 34a–34d show the method of manufacturing a flexible ribbon wire for use in the present invention.

FIG. 35 shows a partial perspective view of an embodiment of the invention which utilizes expandable wire tunnels for the wires.

FIG. 36 shows a top view of the arrangement of a flexible ribbon wire for use in the present invention.

FIG. 37 shows a partial bottom view of the connection between the flexible ribbon wire and membrane pads.

FIG. 38 shows a housing suitable for use in the present invention.

FIG. 39 shows an expansion framework suitable for use with the present invention.

FIGS. 40–42 show an expandable spline used in the expansion framework.

DETAILED DESCRIPTION OF PREFERRED EMBODIMENTS

Figure 6:
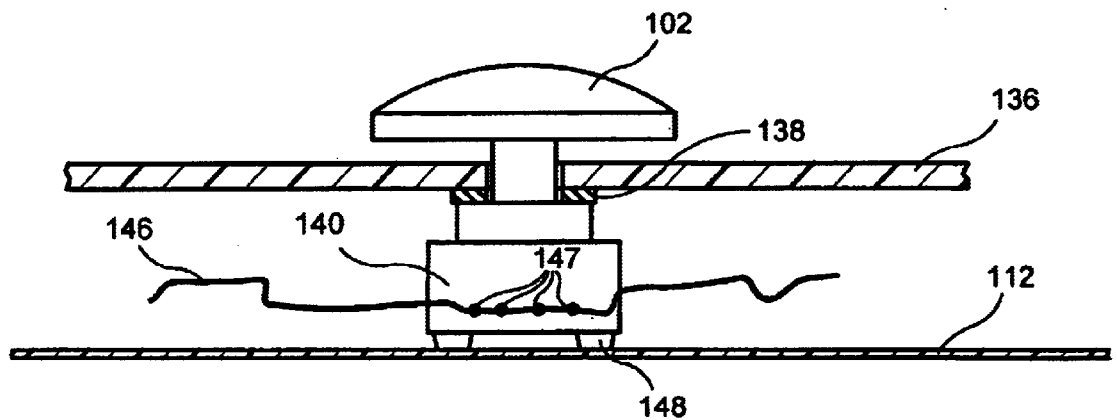
FIG. 6 shows a cross-sectional view of one embodiment of a keyswitch assembly.

The subject invention will now be described in detail for specific preferred embodiments of the invention, it being understood that these embodiments are intended only as illustrative examples and the invention is not to be limited thereto.

FIG. 1 shows an expanded keyboard 100 built in accordance with the present invention. As illustrated by the arrows, the keyboard expands from a closed position to an open position. Upon expansion, the keytops 102 remain the same size in the illustrated embodiment. The key pitch 104, however, is larger in the expanded state than the key pitch in the contracted state.

The keyboard 100 has an expandible and contractible housing 106. The housing is formed of a material which is strong and durable, yet light weight. High density polyethylene is one such material, however, lightweight metal may also be used as well as other plastics. The housing has two members, a right half 108 and a left half 110. Each keyboard half 108, 110 also includes a bottom tray $112_R$, $112_L$, respectively. The right half 108 is telescopically attached to the left half 110. The telescopic attachment is achieved in the illustrated embodiment by the interconnection of side walls 116 and 118. Side wall 116 of left half 110 fits within a pocket formed by side wall 118 of right half 108 as shown in FIG. 2. Alternatively, the telescopic attachment may be located on the bottom of the housing, or may take other forms known to those skilled in the art, such as a locking groove arrangement.

A locking latch 120 is located on the side wall 118 to hold the keyboard halves in the expanded position. As shown in FIG. 3B, the locking latch is a flexible tongue 122 with a protuberance (not shown) on the outer side. The protuberance cooperates with a recess 124 in the side wall 116 of the left housing half 114. Although illustrated here on the side wall of the housing, the latch may also be located on the bottom tray $112_R$, $112_L$ Placing the locking latch on the bottom tray allows the sides of the keyboard housing to be constructed from a stretch fabric.

A plurality of elastic belts 128 is provided, one for each desired row of keys. In the illustrated embodiment, two rows of keys are provided. Each elastic belt 128 is attached at its right end 129 to the right edge 131 of the right half of the keyboard, and is attached at its left end 133 to the left edge 135 of the left half 110 of the keyboard. The elastic belts may be attached to the housing by adhesive, clamping, staking, rivets or screws. The length and elasticity of the belts is chosen so that when the housing is in a compressed position, the elastic belt remains taut, while still allowing the keyboard to be fully extended into the expanded position.

Each elastic belt is preferably made of a single direction stretch fabric, similar to those used for waistband belts or shoulder belts for wearing apparel. These single direction stretch fabrics are woven to provide single dimension—i.e. linear—stretch characteristics, unlike Lycra Spandex™ (DuPont), which has two dimensional stretch characteristics. The elastic belt may be constructed from alternative stretchable materials, such as medical rubber. Furthermore, the elastic band may be designed so that it provides some reduction in radio frequency passage by weaving conductive fibers into the elastic band, or by applying electrically conductive coatings to the band.

FIG. 4 illustrates an alternative embodiment of the keyboard of the present invention. In this embodiment, the keyboard is constructed with two expandable and contractible housings 130, 132, one for each half of the keyboard. The two housings are connected together so that they may be adjusted for user comfort, as described in U.S. Pat. No. 4,661,005, which is hereby incorporated by reference. Each keyboard half 130, 132 is constructed so that it is independently expandable.

FIGS. 5–6 illustrate the manner of mounting the switch key assemblies and keytops to the elastic belt. Holes 134 are punched in the elastic belt 136 at the location where keys are to be placed. A glue ring 138 is placed on the underside of the elastic belt around each hole 134. The keyswitch assembly 140 has a mounting ring 142. An operator barrel 144 of the keyswitch assembly 140 is placed through the hole 134, and the mounting ring 142 is placed into the glue ring 138. The glue ring 138 is allowed to cure, thereby fastening the keyswitch assembly to the elastic belt. Key top 102 is then attached to the operator barrel 144. The key top 102 may be attached via a frictional fit, or adhesive may be used. The keyswitch assembly 140 is a standard keyswitch, known to those skilled in the art.

Each keyswitch assembly is connected via a flexible circuit tape 146 to the adjacent keyswitch assembly. The flexible circuit tape is preferably a four conductor ribbon wire, and is connected at four connection points 147 in a manner known in the art, such as soldering. The flexible circuit tape is routed through the keyboard in a manner known to one skilled in the art, and joins all of the keyswitch assemblies to an attached electronic processor device (not shown). When the operator barrel 142 is pressed, the keyswitch assembly provides an electrical response to the attached electronic processor device, indicating that the key has been pressed.

Each keyswitch assembly 140 has runners 148 located on the bottom of the assembly. The runners 148 rest on the bottom 112 of the keyboard halves. The runners are constructed from a material which minimizes friction between the runners and the keyboard bottom trays, such as high density polyethylene. The keyboard bottom trays may be coated with a lubricous material such as Teflon™ (DuPont) to further reduce friction. If a metal tray is used, coating such as Silverstone™ (DuPont) is suitable.

Figure 7:
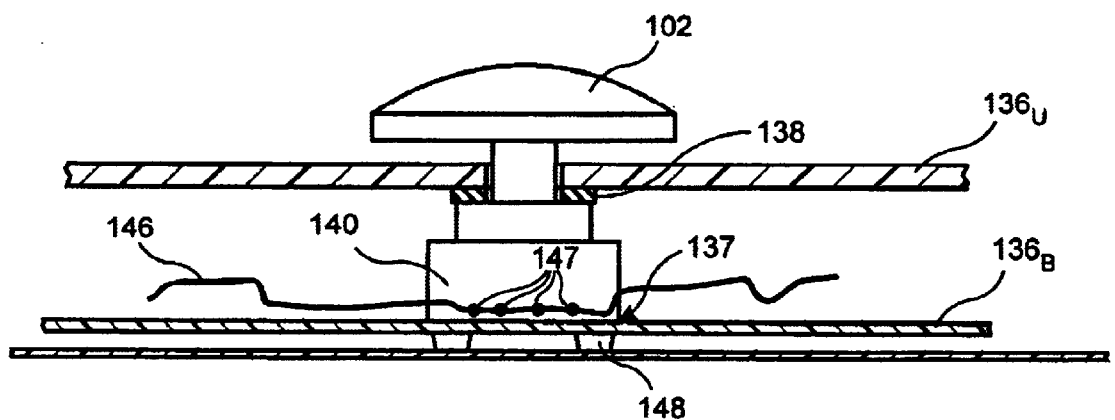
FIGS. 7 shows a cross-sectional view of another embodiment of a keyswitch assembly.

FIG. 7 shows a keyboard which utilizes two elastic stretch belts per row of keys, an upper elastic belt $136_U$ and a lower elastic belt $136_B$. In this embodiment, the bottom elastic belt is made of the same material and has the same length and elasticity characteristics as the top belt. The left end of the bottom belt is mounted to the left edge of the left half of the keyboard housing. The right end of the bottom belt is mounted to the right edge of the right half of the keyboard housing. The keyswitch assembly 140 is mounted to the upper belt $136_u$ in the manner previously described. The bottom portion 137 of the keyswitch assembly 140 is attached to the lower elastic belt $136_b$ in any suitable manner, such as gluing. When the keyboard housing 130 is telescopically extended from the contracted position to the expanded position, both belts $136_u$, $136_b$ will stretch with approximately the same amount of tension because they are of the same length and have the same elasticity characteristics. The lower elastic belt $136_b$ therefore assists in keeping the keyswitch assemblies 140 in an upright vertical position.

In an alternative embodiment that is not illustrated, a single elastic belt supports all of the rows of the keyswitch assemblies instead of separate elastic belts for each row of keys. In this embodiment, a single elastic belt which is as wide as the keyboard housing is utilized. All other aspects of the keyboard design are the same as described herein with respect to the multiple belt embodiment. One advantage of the multiple belt embodiment over the single belt embodiment is that each key row may be separately tailored to provide the optimum expansion and compression for that row of keys. For example, in a traditional computer keyboard, the bottom row of keys consists of function keys—such as "control" and "alternate"—and the "space bar." The keytops of these keys are differently sized than the keytops in the adjacent row. By choosing an elastic belt with different stretch characteristics, the bottom row can be expanded differently than the adjacent belt.

The elastic characteristics of the elastic belts may be altered by adding overlay coatings to the elastic belt. The overlay coating may be rigid, which would prevent stretching in the section which is overlaid. Alternatively, the coating may be a stretchable elastomeric coating. A stretchable elastomeric stretch coating would modify the inherent stretch characteristics at the points where the coating is applied but would not totally prevent stretching. The coating may be selectively applied by spraying with an aperture mask, or by pressure coating, as by a tampon coater. By selectively applying the desired coating, the characteristics of the expanded keyboard may be tailored as desired.

FIGS. 8–11 show an alternative embodiment of the present invention. In this alternative embodiment, applique studs 150 are fastened to the elastic belt 136. The applique studs 150 may be fastened by staking them to the elastic belt (as illustrated), or by gluing the studs to the elastic belt. The applique studs surround each keytop 102, and are of various heights. In the illustrated embodiment, the studs at the left and right edges 151, 153 of the keytop 102 are longer than those at the top and bottom edges 155, 157 of the keytop 102. In the compressed position of the keyboard illustrated in FIGS. 8 and 9, the applique studs 150 are located near the keytops. In the expanded position of the keyboard illustrated in FIGS. 10–11, the applique studs are located further away from the keytops. In operation, the applique studs will direct a slightly misplaced keystroke by a user's finger 152 towards the center of the keytop. This can improve typing accuracy.

FIGS. 12–13 show an alternative embodiment of the present invention with expandable key tops. In this embodiment, the elastic belt 136 is prepared in the same manner as previously described, and the keyswitch assembly 140 is fastened to the elastic belt in the same manner as previously described. An inner strike plate 152 is attached to the operator barrel 144. The expandable keytops 154 are constructed from a stretchable material. One suitable material may be skinned foam. A retaining ridge 156 is molded into the key top. A gusset plate 158 is placed over the retaining ridge, and stakes 160 are placed through the gusset plate 158 and through the elastic belt 136. A plastic washer 162 is placed over the stake 160 so that it is adjacent to the elastic belt, and the stake is affixed to fasten the keytop 154 to the elastic belt. In operation, when a user strikes the keytop 154, the keytop 154 deflects downward and presses the strike plate assembly 152. This operates the operator barrel, which sends an electrical response to an attached electronic device (not shown) through the flexible circuit tape 146. As an alternative to staking, the keytop may be fastened to the elastic belt with adhesive. FIG. 13 shows the expandable keytop in an expanded position. When the elastic belt 136 is stretched by the movement of the keyboard housing from a contracted state to an expanded state, the plastic stakes 160 are moved apart. Correspondingly, the edges 159 of the stretchable keytop 154 are pulled apart. In this manner, the keytop is expanded and provides a larger keytop striking surface 161 for the typist's fingers when the keyboard is in an expanded mode.

Figure 14:
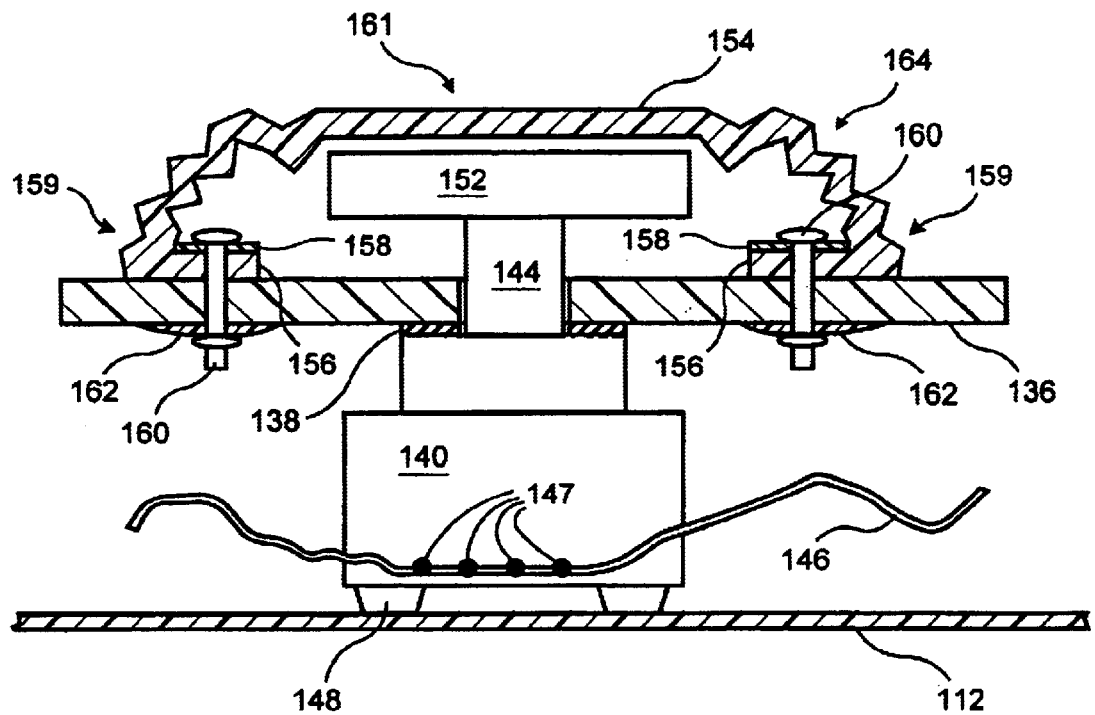
FIG. 14 shows a cross-section of a keyswitch assembly which utilizes a foam overcap keytop with pleated edges in a contracted state.
Figure 15:
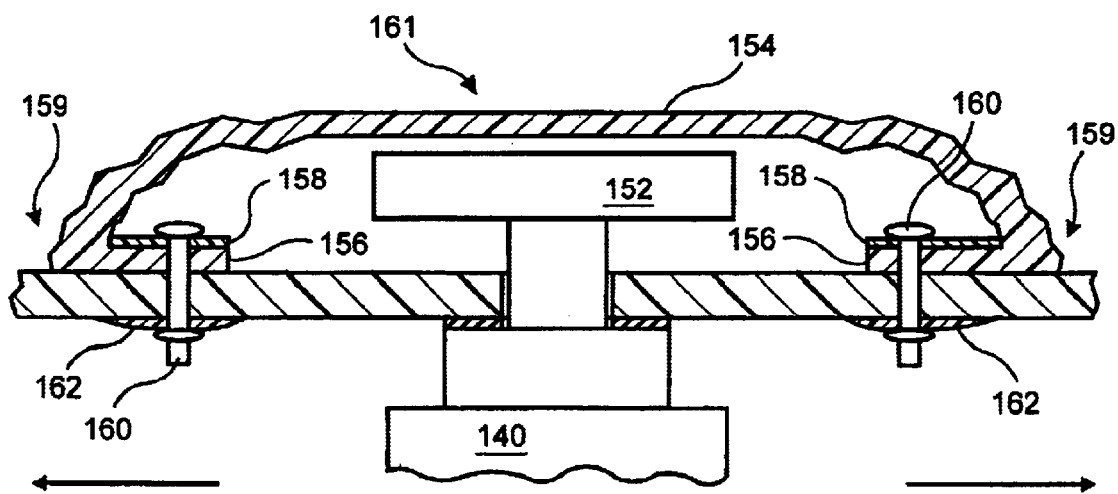
FIG. 15 shows a cross-section of a keyswitch assembly which utilizes a foam overcap keytop with pleated edges in an expanded state.

FIGS. 14 & 15 show an alternative expandible key top in the compressed and expanded positions, respectively. This keytop is similar to the keytop shown in FIGS. 12 and 13, except the edges 159 of the expandable keytop are molded to include expandable pleats 164. The expandable pleats 164 provide additional expansion capabilities to the keytop.

Figure 16:
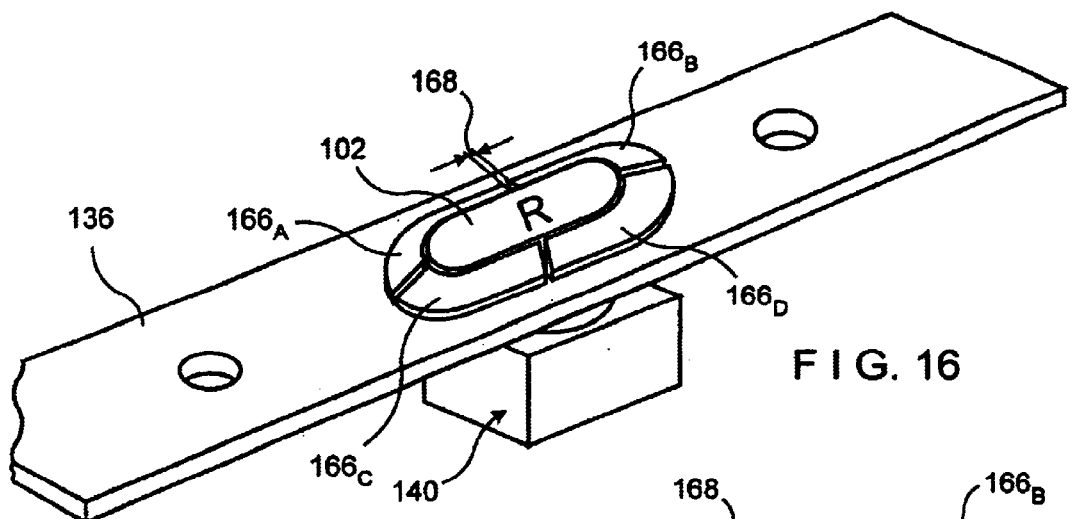
FIG. 16 show a partial perspective view of a row of keys which utilize segmented key tops.
Figure 17:
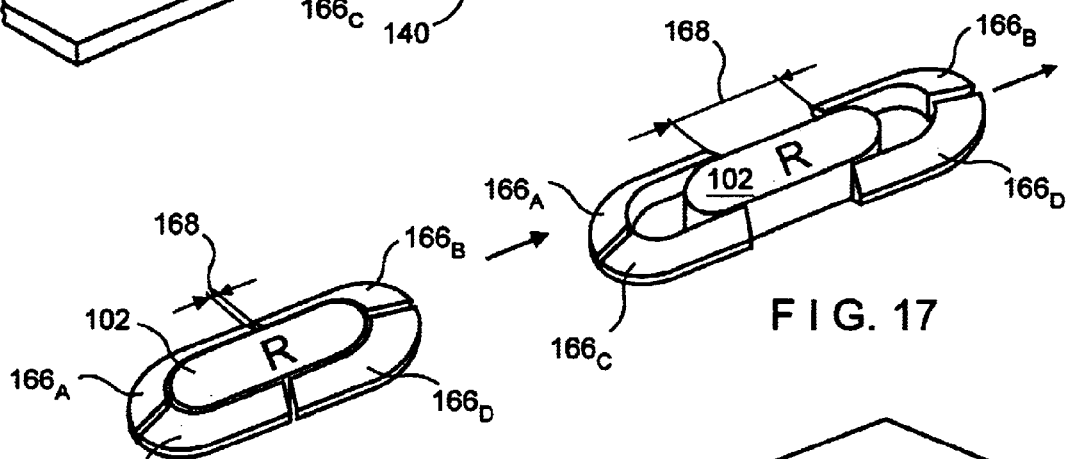
FIG. 17 shows a partial perspective view of a key top with associated segmented key tops.

FIGS. 16–17 show an embodiment of the expandable keyboard that utilizes key segments $166_A$, $166_B$, $166_C$, $166_D$. The keyswitch assembly 140 is glued to the elastic belt in the manner previously described. The key top 102 is frictionally fit to the operator barrel 142 (not illustrated) of the keyswitch assembly. Four key segments $166_A$, $166_B$, $166_C$, $166_D$ are arranged around the keytop 102. Each of the key segments is attached to the elastic belt 136 by any suitable means, such as gluing or staking. In the contracted position illustrated in FIG. 16, the key segments $166_A$, $166_B$, $166_C$, $166_D$ are located adjacent the key top 102, with only negligible gaps 168. Upon movement of the keyboard from a contracted position to an expanded position, the elastic belt 136 is stretched. Accordingly, the key segments 166 are moved laterally away from the key tops, increasing the size of gaps 168. In use, the key segments direct a user's fingers towards the keytop thereby providing a larger effective key striking area. Although illustrated and described with four key segments, any number of segments may be used to achieve the same results.

Figure 18:
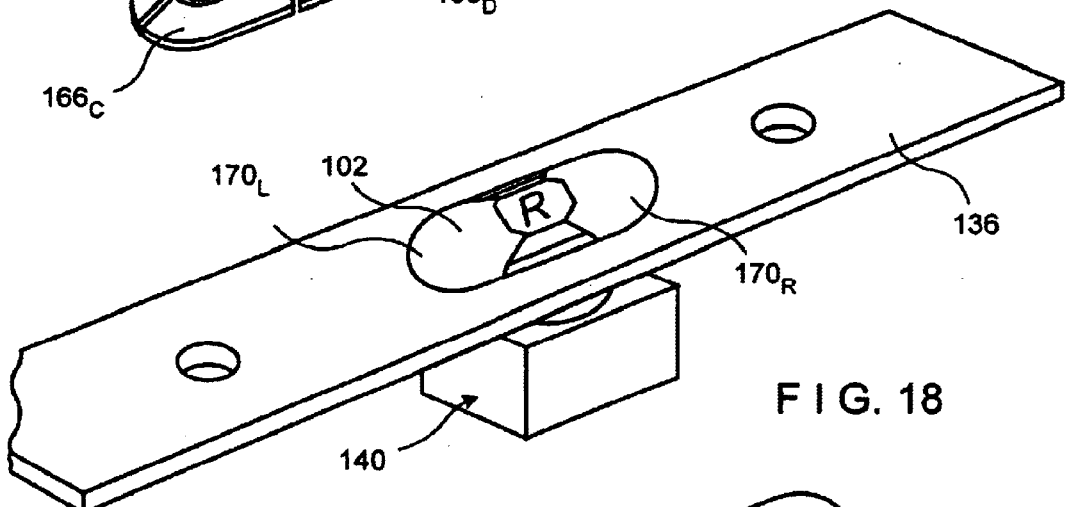
FIGS. 18–21 show an embodiment of the keyboard which utilizes key overshells.
Figure 19:
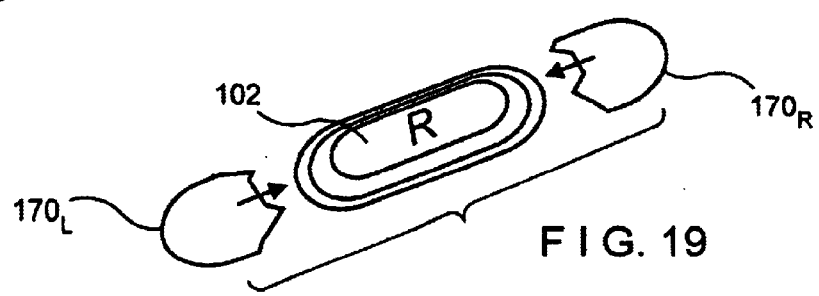

FIGS. 18–21 show key button overcaps suitable for use with the present invention. In this embodiment, the keyswitch assembly 140 is glued to the elastic belt 136 in the manner previously described. The key top 102 is attached to the operator barrel of the keyswitch assembly. Right and left key button overcaps $170_R$, $170_L$ are provided for each key. Each of the key button overcaps is attached to the elastic belt 136 by any suitable means, such as gluing or staking the overcap to the elastic belt. As shown in FIG. 18, when the keyboard is in a contracted position, the overcaps 170 cover a substantial portion of the key top 102, so that only the enscribed keybutton name is visible. When the keyboard is in the expanded position shown in FIG. 21, the key button overcaps 170 move outward laterally from the keytop 102, exposing a greater surface area of keytop 102.

Figure 20:
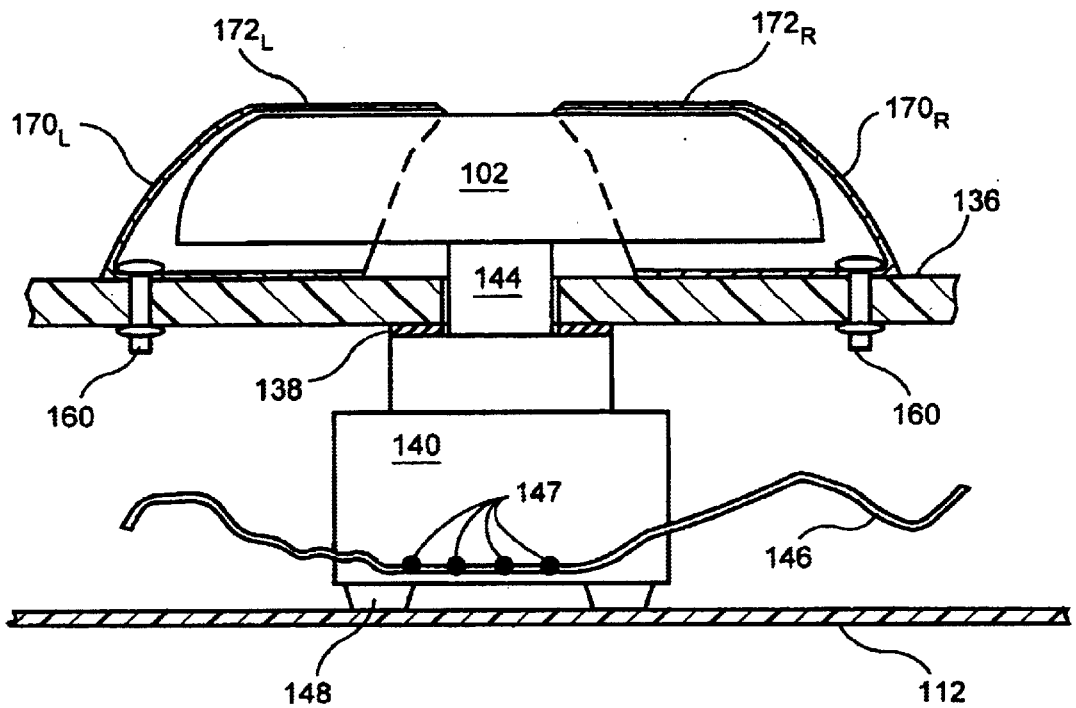
Figure 21:
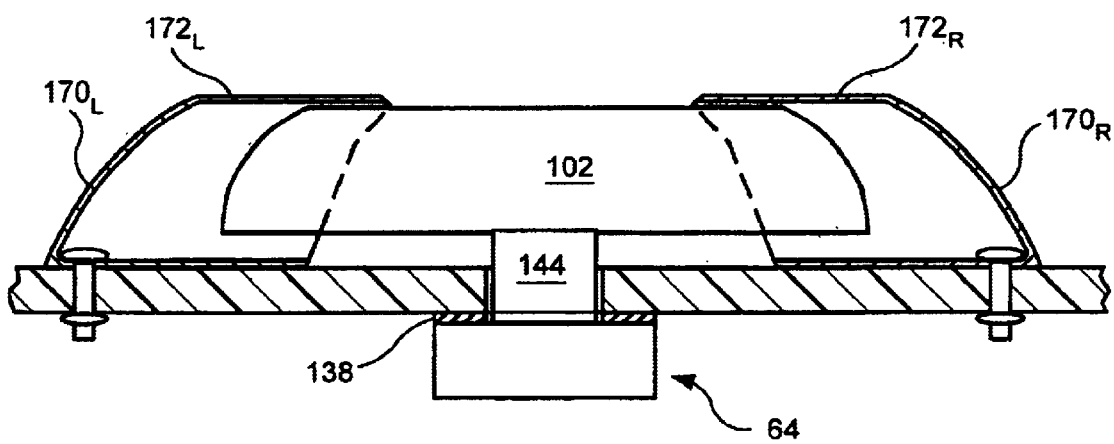

The construction of the key button overcaps is shown in more detail in FIG. 20, which illustrates a keyswitch assembly utilizing key button overcaps in a contracted state. Each key button overcap $170_L$ and $170_R$ has a corresponding extending edge $172_L$, $172_R$. The extending edges overlay the keybutton and are constructed from a flexible material. FIG. 21 illustrates the same keyswitch assembly as FIG. 20 in an expanded state.

In operation in the contracted state illustrated in FIG. 20, a user may press either on the key top 102, which is directly activates the keyswitch assembly, or may press on the extending edges $172_L$ or $172_R$, which will contact and operate key top 102 indirectly due to their flexibility. Similarly, in the expanded state illustrated in FIG. 21, an operator may press on either the key top 102 or flexible edges 172 to operate the keyswitch. Accordingly, the key button overcaps provide a larger key striking zone in the expanded state without causing a corresponding decrease in the size of the striking zone in the contracted state.

Figure 22:
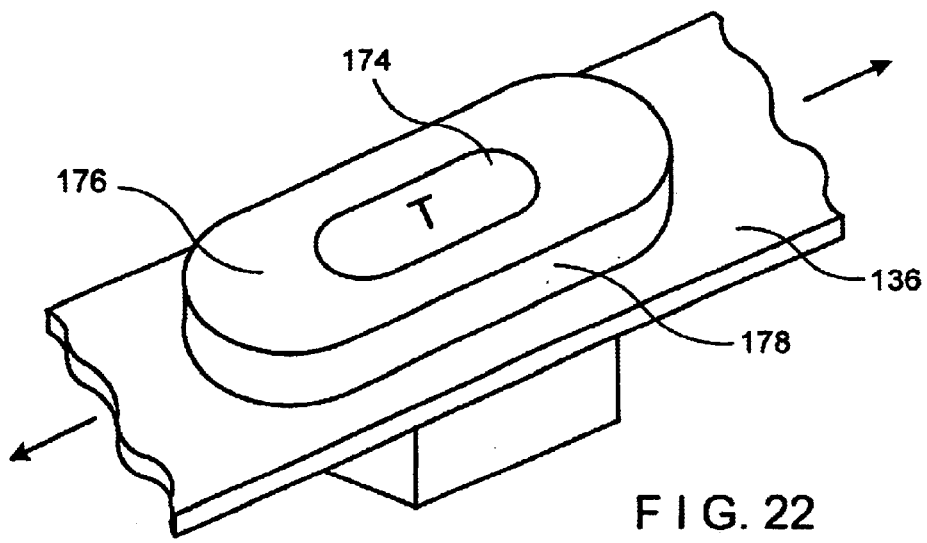
FIGS. 22–24 show a keytop which is expandable.
Figure 23:
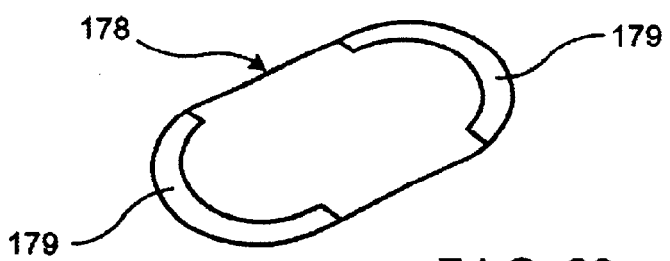
Figure 24:
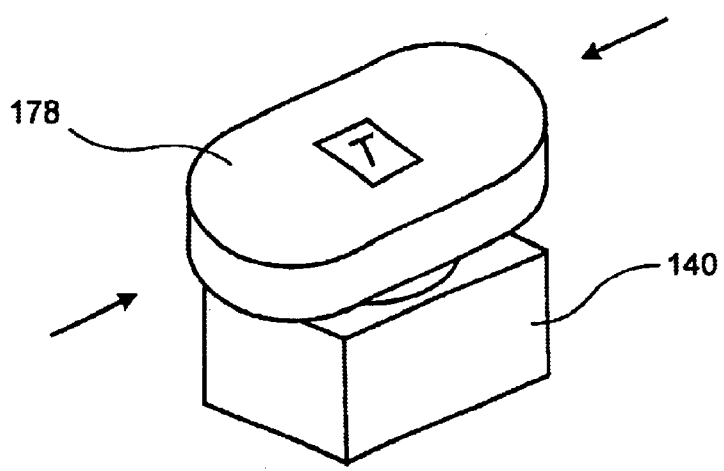

FIGS. 22–24 show another embodiment of a keytop 178 of the present invention. This embodiment of the keytop includes an inner keytop portion 174 and an outer keytop portion 176. The inner keytop portion is formed from a substantially solid material, such as polyethylene. It is sized so that it supports the entire character zone of the keytop. The bottom surface of the inner keytop portion is adapted to cooperate with an inner strike plate (as illustrated in FIGS. 12 and 13). The outer keytop portion 176 is cast of a readily stretchable material, such as elastomeric foam, with the inner keytop integrally cast in place. The keytop 178 is then mounted to the elastic belt by applying glue strips to gluing strips 179 at the end portions of the underside of the keytop 178, as shown in FIG. 23. The glue strips are then adhered to the elastic belt 136 while the belt is in the contracted position. Alternatively, the end portions may be staked to the elastic belt. When the keyboard is moved from a contracted position to an expanded position, the elastic belt 136 is stretched laterally. Correspondingly, the keytop 178 is stretched laterally, providing an expanded keytop striking surface.

Figure 25:
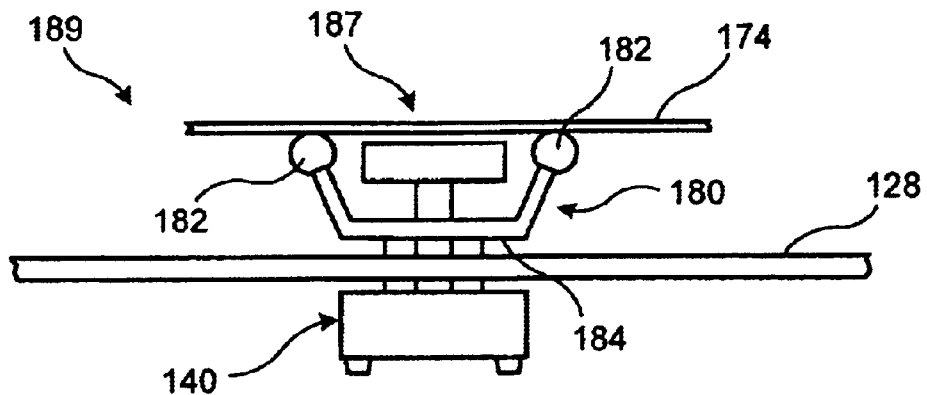
FIGS. 25–27 show a mechanism for supporting an expandable keytop.
Figure 26:
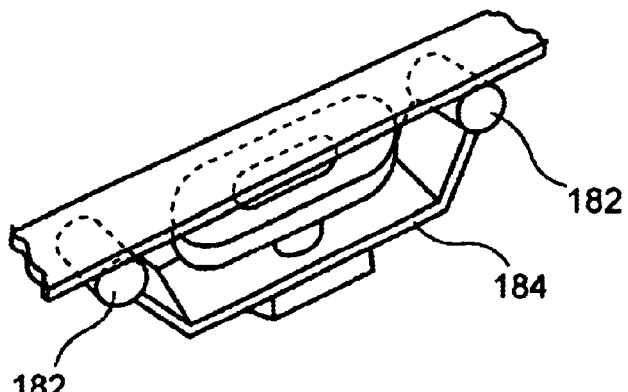
Figure 27:
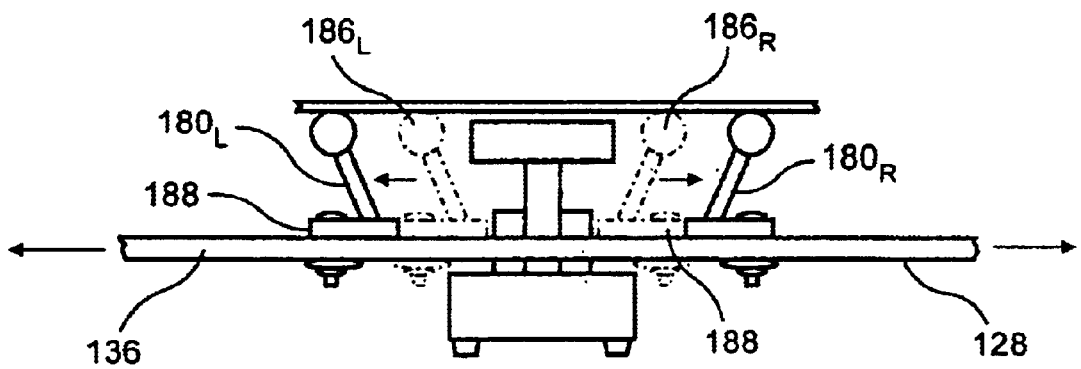
Figure 28:
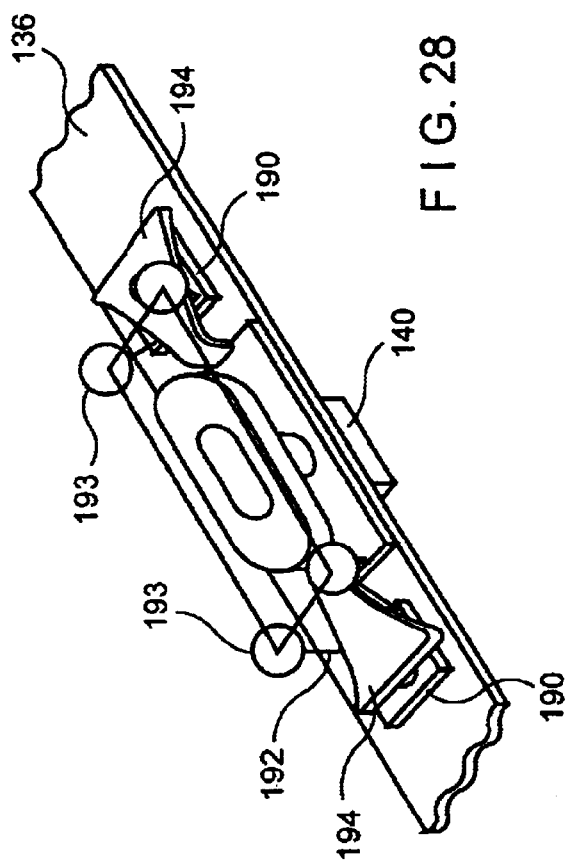
FIGS. 28–33 show a supporting and expanding mechanism for an expandable keytop which expands both laterally and longitudinally.

One potential drawback of using expandable keytops made of elastomeric foam is that the center portion of the keytops may tend to sag. To eliminate this drawback, support structures may be provided, as shown in FIGS. 25–27. In the embodiment of the support structure illustrated in FIGS. 25 and 26, the support structure 180 includes two suspension guide bars 182 mounted to a support plate 184. Each guide bar is located at one side of an expandable keytop 174 (partially shown). The support plate 184 is mounted to the keyswitch assembly 140 by any suitable means, such as gluing. When the keyboard is moved from a contracted state to an expanded state, the support structure 180 moves with the keytop. Thus, the guide bars 182 will support the center section of the expandable keytop.

As shown in FIG. 27, the support structure may alternatively be constructed from two supporting pieces $180_L$, $180_R$ for each keytop. Each supporting piece has a guide bar 186 attached to a supporting plate 188. The supporting plate is attached to the elastic belt 136 by any suitable means, such as staking or gluing. Each supporting piece is located so that the guide bars $186_L$, $186_R$ are in the center 187 of the expandable keytop 189. When the keyboard is moved from a contracted state to an expanded state, the supporting pieces $186_L$, $186_R$ move to the areas indicated by dotted lines. In this manner, the guide bars $186_L$, $186_R$ support the center 187 of the keytops 189. Since the guide bars are not rigidly connected together, when the keytop is pressed, a user's fingertip will tend to deflect the suspension guide bars. This will help deflect the fingertip to the center of the key, assuring a firm keystrike.

Figure 29:
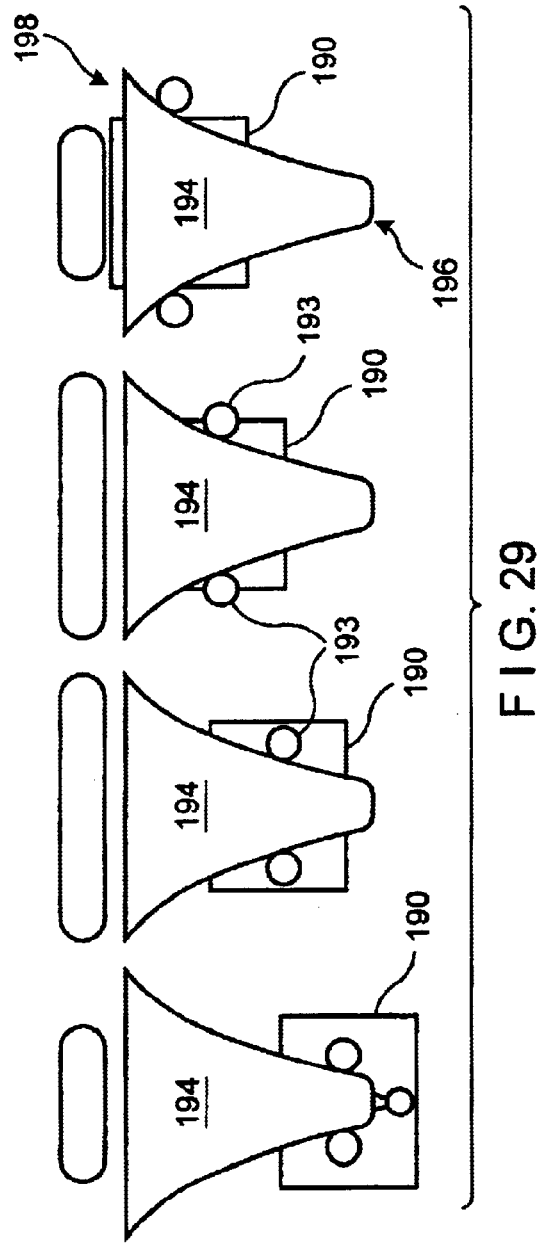
Figure 30:
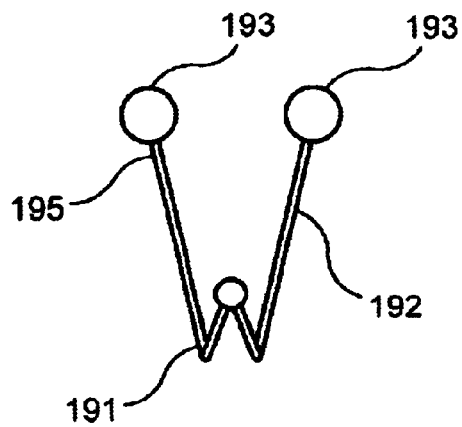
Figure 31:
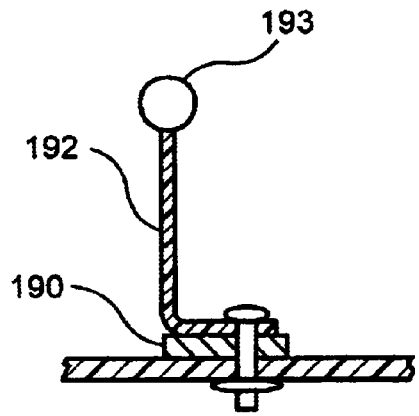
Figure 32:
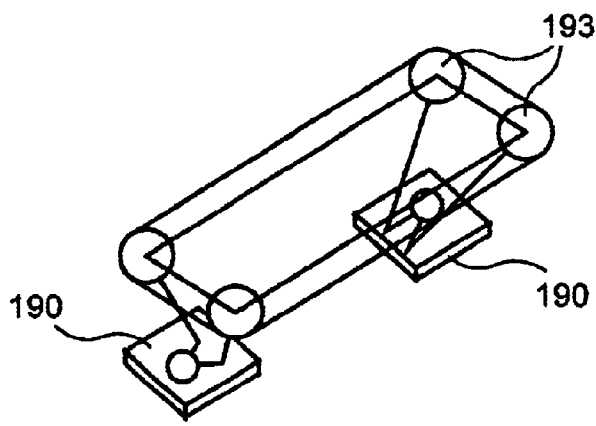
Figure 33:
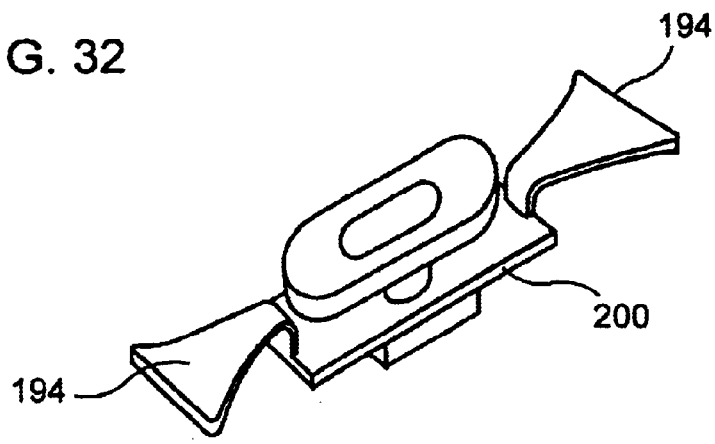

FIGS. 28–33 illustrate an alternative embodiment of the present invention which expands the keytop elements in the vertical direction. A sled 190 is provided on each side of a keyswitch assembly 140. The sled is attached to the elastic belt 136. End shape definer rods 192 are pivotally mounted to the sleds at one end 191, and at the other end 195 have a definer ball 193. A cam plate 194 is provided at each side of the sled. As illustrated in FIG. 29, each cam plate has a proximal end 196 and a distal end 198. The cam plate is narrower on the proximal end 196, and progressively widens as it reaches the distal end 198. Each cam plate is fixedly mounted to a keyswitch assembly 140 by a support plate 200. When the keyboard is moved from the compressed state to the expanded state, the elastic belt moves the sleds 190 away from the keyswitch assembly 140. The cam plates 194 force the end shape definer rods apart. The definer balls 193 press against the inside corner of the keytop surface material. Thus, when the keyboard is moved from a contracted state to an expanded state, the definer ball presses against the inside corners of the keytop, forcing the keytop to expand.

With this mechanism, the keytops may be covered with two dimensional elastic fabric. One suitable fabric is Spandex™. Because the covering is elastic, it will drape over the definer balls. When the keytop is pressed, the center of the keytop will sag slightly more than the outside edges. This forms a concave well. The user's fingertip will be guided into this well. This helps position the user's finger directly over the underlying keyswitch assembly, assuring a solid key stroke and reducing typing errors. The covering material is held to the elastic belt by adhesive and/or staking clips.

FIGS. 34a–34d illustrate a method of forming a flexible circuit tape for use in the present invention. The circuit tape 202 is preferably formed from a flat four conductor ribbon wire. As shown in FIG. 34b, two forming dies are provided, a movable forming die 204 and a fixed forming die 206. Each forming die has a plurality of forming bars The forming bars are spaced so that the movable forming set may be moved through the fixed forming set without interference. In operation, the forming dies 204, 206 are placed in the starting position shown in FIG. 34b, and a flexible circuit tape 202 is placed between the forming dies. The movable forming die is moved from the starting position to the final position shown in FIG. 34c. The spacer bars form accordion folds 210 in the ribbon wire, forming the flexible circuit tape, as illustrated in FIG. 34d. The accordion folds allow the wire to expand and contract when the keyboard is moved from an expanded to contracted position and vice versa.

To prevent the flexible circuit tape from becoming tangled during the expansion and contraction of the keyboard, the circuit tape may be placed inside a wire tunnel as By illustrated in FIG. 35. The wire tunnel 218 is formed by using two elastic belts 212, 214, which are joined together at joining seams 216, forming a tunnel 218 there between. The circuit tape 202 is placed within this tunnel, which prevents the wires from becoming tangled. Preferably, in this embodiment, keyswitch membrane pads 220 are used instead of keyswitch assemblies. It is preferable that the keyswitch membrane pads 220 are solidly fixed to the elastic belt.

To connect the membrane pads together, it is preferable to turn the wire 180 degrees at turning points 222 between keyswitch membrane pads, as illustrated in FIG. 36. Accordingly, the finished connection will appear as shown in FIG. 37, with accordion folds 202 alternating between membrane pads 220.

In another embodiment of the keyboard illustrated in FIGS. 38–47, the keyboard can expand both in the longitudinal direction 236 and in the lateral direction 238. As seen in FIG. 38 the keyboard has a housing 224 formed of a first housing part 226, second housing part 228, third housing part 230, and fourth housing part 232. Each housing part is telescopically attached to the adjacent housing part. An expansion mechanism 234 is mounted within the housing 224.

As illustrated in FIG. 39 the expansion mechanism 334 has a top frame bar 240, a bottom frame bar 242, a right frame bar 244, a left frame bar 246, and a middle frame bar 248. Each frame bar is formed from a pair of interlocking spline bars 356. The interlocking spline bars are extendible from a compressed position to an expanded position. A first coupler 250 attaches the left end 241 of the top frame bar to the top end 247 of the left frame bar 246. A second coupler 252 attaches the right end 239 of the top frame bar 240 to the top end 243 of right frame bar 244, a third coupler 254 attaches the left end 259 of the bottom frame bar 242 to the bottom end 249 of the left frame bar 246, and a fourth coupler attaches the right end 261 of the bottom frame bar 242 to the bottom end 245 of the right frame bar 244. Fifth and sixth couplers 258, 260 attach the middle frame bar 248 to the top and bottom frame bars in the centers 255, 257 of the top and bottom frame bars respectively. Horizontal coil springs 262 are placed between the frame couplers and over the top and bottom frame bars. The coil springs 262 are chosen so that in the expanded position, they provide slightly more force than the tension of the elastic bands. The first, second, third and fourth couplers 250, 252, 254, 256 are attached to the first, second, third and fourth housing parts 226, 228, 230, 232.

Mounted to the right and left frame bars 244, 246 are a series of end row couplers 264. An end row coupler is provided at each end of a row of keys. Each end row coupler is slidably mounted on a frame bar. Middle row couplers 266 are provided for each row of keys. A vertical coil spring 268 is placed between each adjacent end row coupler 264 and between each adjacent middle row coupler 266.

Figure 43:
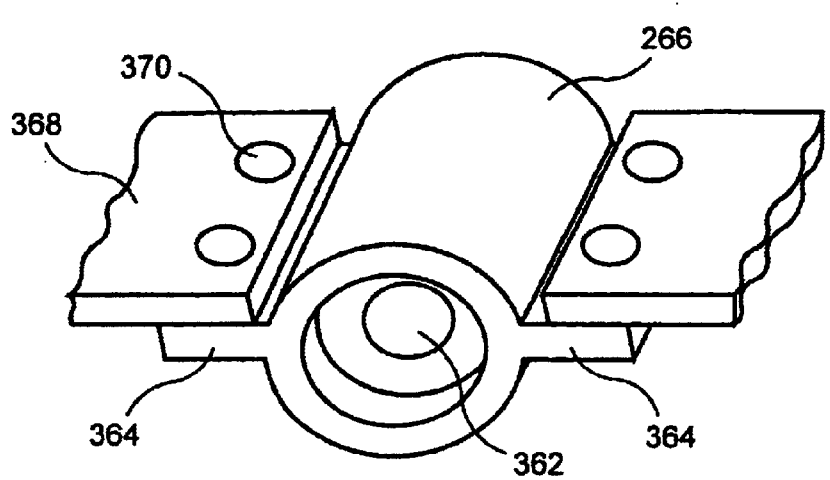
FIG. 43 shows a perspective view middle coupling joint used in the expansion frame work.
Figure 44:
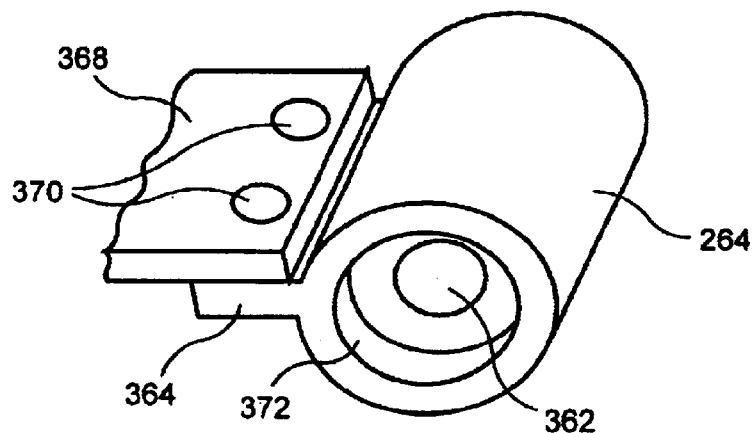
FIG. 44 shows a perspective view of an end coupling joint used in the expansion frame work.
Figure 45:
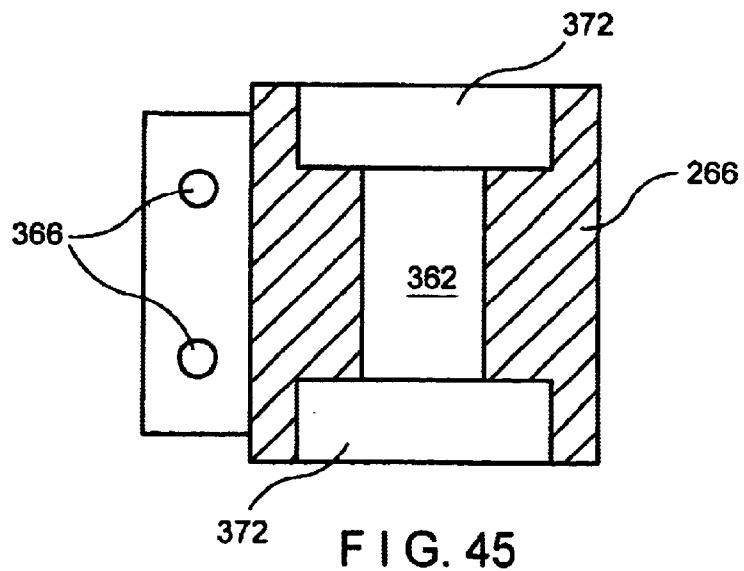
FIG. 45 shows a cross-sectional view of an end coupling joint used in the expansion framework.

FIGS. 43–45 illustrate the details of the end row couplers 264 and middle row couplers 266. The end row coupler has a bore 362. A belt attachment plate 364 has two stake attachment points 366. An elastic belt 368 is attached by stakes 370 to the end row coupler. The end row couplers have tic spring recess seats 372. When placed over the spline bar, the vertical coil springs rest on the spring recess seats 372. The construction of the middle row coupler 266 is similar to the construction of the end row coupler 264, except the middle row coupler has two belt attachment plates 364.

A plurality of elastic belts 270 is provided to support the keyswitch assemblies (not shown), and are attached to the row couplers at each end. Preferably, in this embodiment, the elastic belts 270 are formed into wire tunnels as previously described. The keyswitch assemblies are fastened to the plurality of elastic belts 270 in the manner previously described. An elastic wire tunnel 270 connects each middle row coupler 266 to the adjacent middle row coupler 266. A flexible circuit tape may then be routed through these tunnels and into each row tunnel.

FIGS. 40–42 show an expandable spline 356 used in the expansion framework. Each expandable spline 356 has a male portion 358 and female portion 360. The male and female portions 358, 360 are formed so that they mate together, as illustrated in FIG. 42, and allow the pieces to extend and contract in the directions indicated by the arrows.

As seen in FIG. 39A, a first horizontal pivot bar 280 is attached to the left frame bar 246. A horizontal detent bar 282 is pivotably mounted to the pivot bar 280. The detent bar includes a latch 288 and a handle 290. The latch 288 cooperates with the right edge of the keyboard to lock the keyboard into a compressed position. Similarly, a vertical pivot bar is attached to the top of the frame. A vertical detent bar is pivotable mounted to the vertical pivot bar. The vertical detent bar includes a latch which cooperates with the bottom edge of the keyboard.

Figure 47:
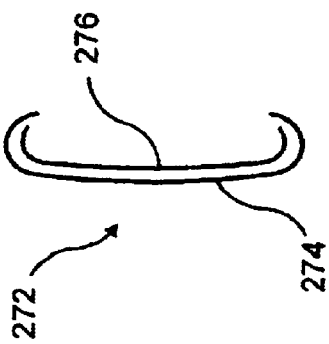
FIG. 47 shows a cross-section through line B-13 in FIG. 46.
Figure 46:
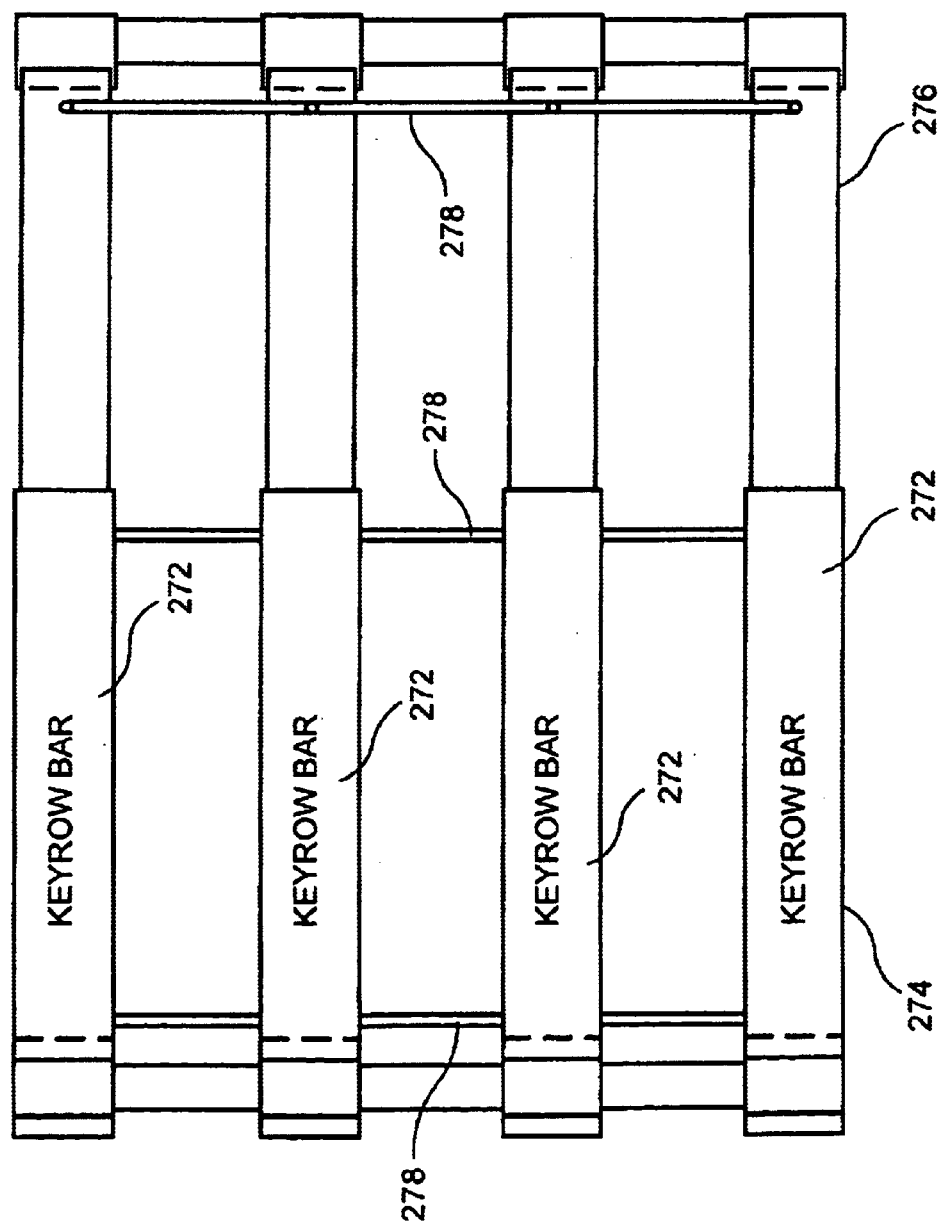
FIG. 46 shows an embodiment of the invention which used parallel support bars.

A supporting mechanism should be located under the keyswitch assemblies to support the keyswitch assemblies and to assure a firm keystrike when a user presses the keytop. One method to accomplish this is a series of parallel supporting bars 272. One bar is provided for each desired row of keys, and provides support for the keyswitches in that row. Each parallel supporting bar 272 has a left half 274 and a right half 276. The halves 274, 276 of the supporting bars are connected to the end row couplers 264 and middle row couplers 266. The left half 274 and the right half 276 of the bars have a cross-section as shown in FIG. 47. This allows the parallel supporting bars to be extended from a contracted position to an expanded position.

To keep the keyboard from expanding too much and to assure even spacing of he rows of the keyboard, a plurality of limit cords 278 are provided. Each limit cord 278 connects adjacent couplers in a column. Accordingly, when the keyboard is expanded, the limit cords will limit the amount of expansion to the length of the cord. When the keyboard is compressed, the limit cords become slack.

In operation, the keyboard is expandable from a compressed size to an expanded size. A user operates the vertical detent bar to release the detent. The vertical coil springs 268 exert force against the end row couplers 264, forcing the couplers and the associated right and left frame bars 244, 246 to expand. The limit cords 278 limit the total vertical expansion of the keyboard. The limit cords also assure that the spacing between the parallel supporting bars 272 is even. The user can then operate the horizontal detent bar 282 to release the horizontal detent. The horizontal coil springs 262 will then exert force against the end couplers, forcing the keyboard to expand in the longitudinal direction 236. Alternatively, the sequence of expansion may be reversed, or the keyboard may be used while the keyboard is expanded only in one direction. To compress the keyboard, a user presses against the edges of the keyboard to overcome the force exerted by the springs, and operates the detent mechanisms to lock the keyboard into the compressed position.

Figure 49:
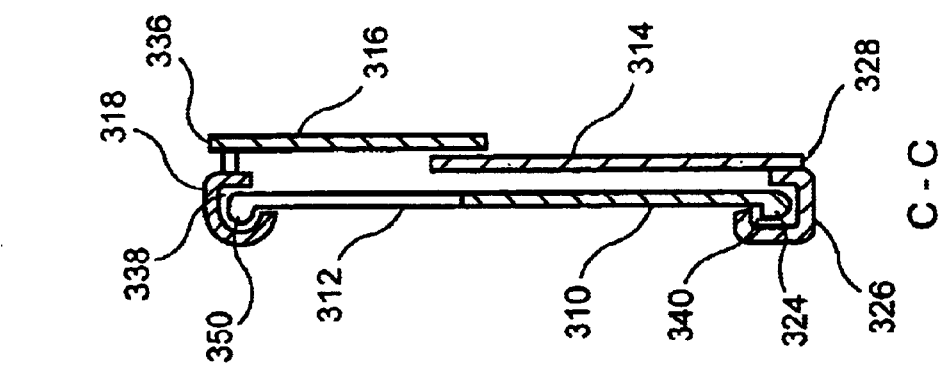
FIG. 49 shows a cross-section through line C—C in FIG. 48.
Figure 48:
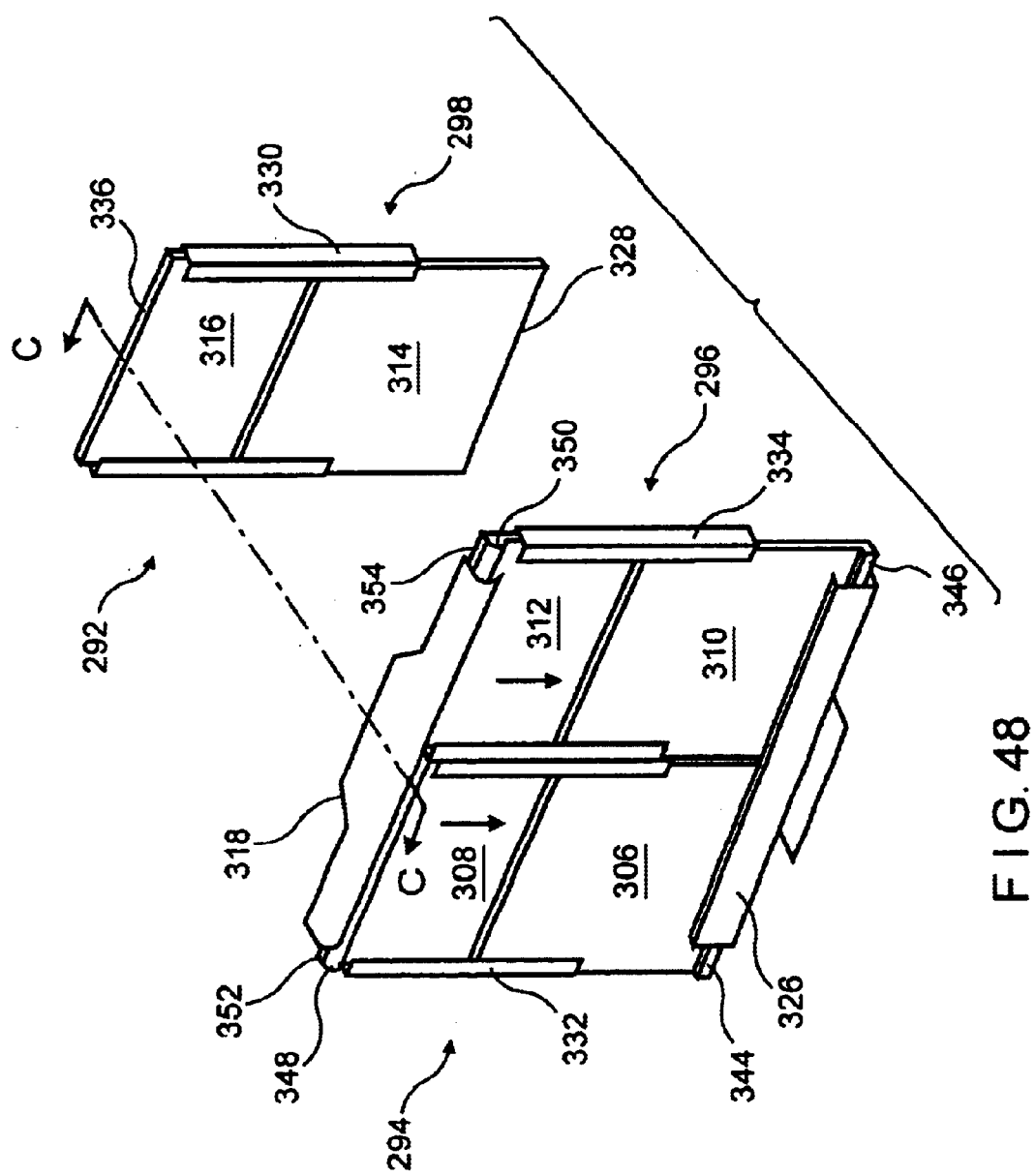
FIG. 48 shows a perspective view of a rear panel suitable for use in the present invention.

In another embodiment of the invention illustrated in FIG. 49 which expands both vertically and horizontally, an expandable rear plate 292 is used to support the keyswitch assemblies. The rear plate 292 is formed from a left front plate pair 294, a right front plate pair 296, and a back plate pair 298. The back plate pair 298 is formed from a first rear plate 314 slidably mounted to second rear plate 316 by channels 330. The right front plate pair 296 is formed from first front plate 306 attached to second front plate 308 by channels 332. The left front plate pair 294 is formed from third front plate 310 slidably attached to fourth front plate 312 by channels 334. An upper guide 318 is fixedly attached to the top edge 336 of the second rear plate 316. A lower guide 326 is fixedly attached to the lower edge 328 of first rear plate 314. Channels 338, 340 are formed in the upper and lower guides 318, 326. Beads 324, 342 located on the lower edges 344, 346 of the first and third plates 306, 310 are restrained in the channel 340 so that the plates may be moved horizontally, but not vertically. Similarly, beads 348, 350 on the top edges 352, 354 of the second and fourth front plates 308, 312 are located in the channel 338 in the upper guide 318. The top and bottom edges of the plate pairs slide in guideways in the housing. The left end right edges of the plate pairs are attached to end plates that form the end of the housing. Horizontal limit cords (not illustrated) prevent the keyboard from being overexpanded.

In operation, a user grasps the handle and pulls the handle in the direction indicated by the arrows. This causes the plate pairs to expand in the vertical direction. The user can then grasp the left and right edges of the frame plates, and pull the frame in a longitudinal direction to expand the keyboard horizontally. This assures that there is a supporting back plate under the entire keyboard.

what is claimed is:

1. An expandable keyboard comprising:
   a keyboard housing including components movable relative to one another to extend the housing substantially in a single plane from a contracted position to an expanded position;
   at least one elastic belt, the elastic belt attached to the components of the housing, the components of the housing relatively rigid as compared to the elastic belt;
   a plurality of keyswitch assemblies, each keyswitch assembly attached to the elastic belt so that when the keyboard housing is extended from a compressed position to an expanded position the key pitch is increased.

2. The keyboard of claim 1, further comprising:
   a plurality of keytops corresponding to the plurality keyswitch assemblies; the keytops being attached to the elastic belt and cooperating with the keyswitch assemblies.

3. The keyboard according to claim 2 further comprising:
   means for supporting the center section of each keytop.

4. The keyboard of claim 1, wherein the at least one elastic belt is formed of a material which can be stretched in only one direction.

5. The keyboard as recited in claim 1, wherein the increase in key pitch between at least substantially all keys representing letters of an alphabet is substantially uniform at each position of a plurality of positions in which the keyboard is to be operated.

6. The keyboard as recited in claim 1, wherein each keyswitch assembly corresponds to a respective key of the keyboard.

7. The keyboard of claim 1 further comprising:
a plurality of keytops, each keytop attached to a keyswitch assembly;
a plurality of appliques fastened to the elastic belt, the appliques surrounding each keytop.

8. The keyboard of claim 2 further comprising:
a plurality of cam plates, each cam plate fixedly mounted to a single keyswitch assembly;
a plurality of definer rods, each definer rod pivotally mounted to a sled mounted to the elastic belt; each definer rod located in a corner of a keytop;
wherein each definer rod cooperates with an associated cam plate so that when the keyboard housing is moved from a compressed position to an expanded position, the definer rods press against the corners and force the corners of the keytops outward.

9. The keyboard of claim 1 wherein the at least one elastic belt has a conductive fibers which reduce radio frequency emissions.

10. The keyboard of claim 1 wherein an overlay is applied to the at least one elastic belt.

11. The keyboard of claim 10 wherein the overlay is elastomeric.

12. The keyboard of claim 1 further comprising a flexible circuit tape connecting the keyswitch assemblies.

13. The keyboard of claim 1 further comprising: a plurality of keytops corresponding to the plurality of the keyswitch assembly, each keytop connected to a keyswitch assembly.

14. The keyboard of claim 13, further comprising:
a plurality of key segments, corresponding to the plurality of keytops, the key segments surrounding each keytop.

15. The keyboard of claim 14 wherein each key segment has a flexible edge.

16. The keyboard of claim 1 wherein
each keyswitch assembly is attached to at least one elastic belt at the top of keyswitch assembly; and further comprising
at least one second elastic belt attached to the housing, the second elastic belt corresponding to the at least one elastic belt and further wherein each keyswitch assembly is attached to at least one second elastic belt at the bottom of the keyswitch assembly.

17. The keyboard of claim 1 wherein an elastic belt is provided for each row of keys.

18. The keyboard of claim 1 wherein only one elastic belt is provided.

19. The keyboard according to claim 1 wherein each keyswitch assembly has a runner located on the bottom of the assembly.

20. An expandable keyboard, comprising:
a keyboard housing including components movable relative to one another to extend the housing from a contracted position to an expanded position;
at least one elastic belt, the elastic belt attached to the components of the housing, the components of the housing relatively rigid as compared to the elastic belt;
a plurality of keyswitch assemblies, each keyswitch assembly attached to the elastic belt so that when the keyboard housing is extended from a compressed position to an expanded position the key pitch is increased; and
a plurality of keytops corresponding to the plurality keyswitch assemblies, the keytops being attached to the elastic belt and cooperating with the keyswitch assemblies;
wherein at least one of the plurality of keytops is formed of a stretchable material so that the size of the keytop is larger in the expanded position of the keyboard housing than the size of the keytop in the contracted position.

21. The keyboard of claim 20, wherein the keytops are constructed from elastomeric foam.

22. The keyboard of claim 20, wherein the edges of the keytops are pleated.

23. An expandable and contractible keyboard comprising:
a housing which is extendible substantially in a single plane from a contracted position to an expanded position;
a supporting framework including components movable relative to one another to extend the housing substantially in a single plane from a contracted position to an expanded position attached to the housing;
a plurality of elastic belts attached to components of the supporting framework, the supporting framework having components relatively rigid as compared to the elastic belts;
a plurality of keyswitches mounted on the elastic belts;
a connecting wire connected to the keyswitches to provide an electrical response when a keyswitch is pressed.

24. A keyboard according to claim 23 further comprising:
a plurality of extendible parallel supporting bars, each supporting bar being located under an associated elastic belt to support the keyswitches.

25. A keyboard according to claim 23 further comprising:
an expandable back panel attached to the housing, the back panel providing support to the keyswitches.

26. A keyboard according to claim 23, wherein the elastic belts are slidably attached to the framework by couplers.

27. A keyboard according to claim 26, further comprising a plurality of coil springs located between adjacent couplers.

28. A keyboard according to claim 23, wherein the elastic belts form wire tunnels for carrying the connecting wire.

29. A keyboard according to claim 23, wherein the supporting framework includes:
an extendible top frame bar with a proximal end, a distal end, and a center portion;
an extendible bottom frame bar with a proximal end, a distal end, and a center portion;
a proximal frame bar connecting the proximal end of the top frame bar and the proximal end of the bottom frame bar;
a distal frame bar connecting the distal end of the top frame bar and the distal end of the bottom frame bar;
a middle frame bar connecting the center portion of the top frame bar and the center portion of the bottom frame bar.

30. A keyboard according to claim 29, wherein the proximal frame bar, distal frame bar, and middle frame bar are extendible.

31. A keyboard according to claim 30 further comprising:
a plurality of end row couplers slidably mounted on the proximal and distal frame bars, the elastic belts attached to the end row couplers;

a plurality of middle row couplers slidably mounted on the middle frame bars, the elastic belts attached to the end row couplers.

32. A keyboard according to claim 31 further comprising:
a plurality of coil springs, at least one of the plurality of coil springs located between each adjacent end row couplers, and at least one of the plurality of coil springs located between each adjacent middle row couplers.

33. A keyboard according to claim 32 further comprising:
a plurality of extendible parallel supporting bars, each supporting bar attached at one end to an end row coupler and at another end to a middle row coupler, each bar being located under an associated elastic belt so that the supporting bar supports the keyswitches.

34. A keyboard according to claim 33 further comprising:
a plurality of limit cords attached to the parallel supporting bars so that the cords limit the vertical expansion of the framework.

35. A keyboard according to claim 34, further comprising:
a plurality of keytops, each keytop being associated with a keyswitch so that when the keytop is pressed, the keyswitch is activated.

36. The keyboard as recited in claim 23, wherein an increase in key pitch between at least substantially all keys representing letters of an alphabet is substantially uniform at each position of a plurality of positions in which the keyboard is to be operated.

37. The keyboard as recited in claim 23, wherein each keyswitch assembly corresponds to a respective key of the keyboard.

38. A keyboard according to claim 23 further comprising:
a plurality of limit cords attached to the supporting framework so that the cords limit the horizontal expansion of the framework.

39. An expandable and contractible keyboard comprising:
a housing including components movable relative to one another to extend the housing substantially in a single plane from a contracted position to an expanded position;
a plurality of elastic belts attached to components of the housing, the housing having components relatively rigid as compared to the elastic belts;
a plurality of keyswitch assemblies attached to the elastic belt, forming rows of keys.

40. A keyboard as claimed in 39, wherein the housing is extendible in a first direction and a second direction perpendicular to the first direction.

41. The keyboard as recited in claim 39, wherein an increase in key pitch between at least substantially all keys representing letters of an alphabet is substantially uniform at each position of a plurality of positions in which the keyboard is to be operated.

42. The keyboard as recited in claim 39, wherein each keyswitch assembly corresponds to a respective key of the keyboard.

43. An expandable and contractible keyboard, comprising:
a housing which is extendible from a contracted position to an expanded position;
a supporting framework which is extendible from a contracted position to an expanded position attached to the housing, the supporting framework including:
an extendible top frame bar with a proximal end, a distal end, and a center portion;
an extendible bottom frame bar with a proximal end, a distal end, and a center portion;
a proximal frame bar connecting the proximal end of the top frame bar and the proximal end of the bottom frame bar;
a distal frame bar connecting the distal end of the top frame bar and the distal end of the bottom frame bar; and
a middle frame bar connecting the center portion of the top frame bar and the center portion of the bottom frame bar;
wherein the proximal frame bar, distal frame bar, and middle frame bar are extendible;
a plurality of elastic belts attached to the supporting framework;
a plurality of keyswitches mounted on the elastic belts;
a connecting wire connected to the keyswitches to provide an electrical response when a keyswitch is pressed;
a plurality of end row couplers slidably mounted on the proximal and distal frame bars, the elastic belts attached to the end row couplers;
a plurality of middle row couplers slidably mounted on the middle frame bars, the elastic belts attached to the end row couplers;
a plurality of coil springs, at least one of the plurality of coil springs located between each adjacent end row couplers, and at least one of the plurality of coil springs located between each adjacent middle row couplers;
a plurality of extendible parallel supporting bars, each supporting bar attached at one end to an end row coupler and at another end to a middle row coupler, each bar being located under an associated elastic belt so that the supporting bar supports the keyswitches;
a plurality of limit cords attached to the parallel supporting bars so that the cords limit the vertical expansion of the framework;
a plurality of keytops, each keytop being associated with a keyswitch so that when the keytop is pressed, the keyswitch is activated;
wherein the keytops are expandable.

44. An expandable and contractible keyboard, comprising:
a housing which is extendible from a contracted position to an expanded position;
a supporting framework which is extendible from a contracted position to an expanded position attached to the housing;
a plurality of elastic belts attached to the supporting framework;
a plurality of keyswitches mounted on the elastic belts;
a connecting wire connected to the keyswitches to provide an electrical response when a keyswitch is pressed; and
an expandable back panel attached to the housing, the back panel providing support to the keyswitches;
wherein the back panel includes:
a left front plate pair including a first front plate with a top edge slidably attached to a second front plate with a bottom edge;
a right front plate pair including a third front plate with a top edge slidably attached to a fourth front plate with a bottom edge;
a back plate pair including a first back plate with a top edge slidably attached to a second back plate with a bottom edge;
an upper guideway with a channel formed therein, the upper guideway attached to the top edge of the first back plate;

a lower guideway with a channel formed therein; the lower guideway attached to the bottom edge of the second back plate;

wherein the top edge of the first front plate and the top edge of the third front plate are slidably retained in the channel in the upper guideway, and wherein the bottom edge of the second front plate and the bottom edge of the fourth front plate are slidably retained in the channel in the lower guideway.

45. An expandable keyboard comprising:

a keyboard housing including components movable relative to one another to extend the housing substantially in at least one dimension in a single plane from a contracted position to an expanded position;

at least one elastic belt, the elastic belt attached to components of the housing, the housing having components relatively rigid as compared to the elastic belt;

a plurality of keyswitch assemblies, each keyswitch assembly attached to the elastic belt so that when the keyboard housing is extended from a compressed position to an expanded position the key pitch is increased.

46. The keyboard as recited in claim 45, wherein the increase in key pitch between at least substantially all keys representing letters of an alphabet is substantially uniform at each position of a plurality of positions in which the keyboard is to be operated.

47. The keyboard as recited in claim 45, wherein each keyswitch assembly corresponds to a respective key of the keyboard.

48. An expandable and contractible keyboard comprising:

a housing which is extendible substantially in a single plane from a contracted position to an expanded position;

a supporting framework including components movable relative to one another to extend the supporting framework substantially in a single plane from a contracted position to an expanded position attached to the housing;

a plurality of elastic belts attached to components of the supporting framework, the supporting framework having components relatively rigid as compared to the elastic belts;

a plurality of keyswitches mounted on the elastic belts;

a conductive circuit connected to the keyswitches to provide an electrical response when a keyswitch is pressed.

49. The keyboard as recited in claim 48, wherein an increase in key pitch between at least substantially all keys representing letters of an alphabet is substantially uniform at each position of a plurality of positions in which the keyboard is to be operated.

50. The keyboard as recited in claim 48, wherein each keyswitch assembly corresponds to a respective key of the keyboard.

51. A keyboard device, comprising:

a housing including components movable relative to one another to extend the housing from a contracted position to an expanded position;

a plurality of keyswitch assemblies; and at least one elastic belt attached to the components of the housing and extendable between a contracted position and an expanded position, the keyswitch assemblies attached to the elastic belt so that a key pitch between adjacent keyswitch assemblies is greater in the expanded position of the elastic belt than in the contracted position of the elastic belt, the components of the housing relatively rigid as compared to the elastic belt;

wherein the keyswitch assemblies are configured to accept data entry in the expanded position of the elastic belt and in the contracted position of the elastic belt.

52. The keyboard device according to claim 51, wherein the keyswitch assemblies are configured to accept data entry in at least one intermediate position of the elastic belt between the expanded position of the elastic belt and the contracted position of the elastic belt.

53. The keyboard device according to claim 51, wherein the keyswitch assemblies are configured to accept data entry in a plurality of intermediate positions of the elastic belt between the expanded position of the elastic belt and the contracted position of the elastic belt.

54. The keyboard device according to any one of claims 51, 52 and 53, wherein the plurality of keyswitch assemblies corresponds to a complete alphabet.

55. The keyboard device according to any one of claims 51, 52 and 53, wherein each keyswitch assembly corresponds to a respective character of a complete alphabet.

56. The keyboard device according to any one of claims 51, 52 and 53, wherein each keyswitch assembly corresponds to a respective one of a character of a complete alphabet and a numeral of a complete set of digits.

57. The keyboard device according to claim 54, wherein the complete alphabet includes 26 characters.

58. The keyboard device according to claim 54, wherein the complete alphabet corresponds to a roman alphabet.

59. The keyboard device according to claim 51, wherein each elastic belt corresponds to a respective row of keys of the keyboard device.

60. The keyboard device according to claim 51, wherein the key pitch is proportional to an extension of the elastic belt.

61. The keyboard device according to claim 51, wherein each keyswitch assembly corresponds to a respective key of a keyboard set of operational keys including alphanumeric, symbolic and function keys.

62. The keyboard device according to claim 53, wherein an increase in key pitch between at least substantially all keys representing letters of an alphabet is substantially uniform at each position in which the keyswitch assemblies are configured to accept data entry.

63. The keyboard device according to claim 51, wherein each keyswitch assembly corresponds to a respective key of the keyboard device.

64. A keyboard device, comprising:

a housing including components movable relative to one another to extend the housing from a contracted position to an expanded position;

a plurality of keyswitch assemblies; and a plurality of elastic belts attached to the components of the housing and extendable between a contracted position and an expanded position, each elastic belt corresponding to a respective row of keys of the keyboard device, the keyswitch assemblies attached to the elastic belts so that a key pitch between adjacent keyswitch assemblies is greater in the expanded position of the elastic belt than in the contracted position of the elastic belt, the components of the housing relatively rigid as compared to the elastic belt;

wherein the keyswitch assemblies are configured to accept data entry in the expanded position of the elastic belt and in the contracted position of the elastic belt.

65. The keyboard device according to claim 64, wherein the keyswitch assemblies are configured to accept data entry in at least one intermediate position of the elastic belt between the expanded position of the elastic belt and the contracted position of the elastic belt.

66. The keyboard device according to claim 64, wherein the keyswitch assemblies are configured to accept data entry in a plurality of intermediate positions of the elastic belt between the expanded position of the elastic belt and the contracted position of the elastic belt.

67. The keyboard device according to any one of claims 64, 65 and 66, wherein the plurality of keyswitch assemblies corresponds to a complete alphabet.

68. The keyboard device according to any one of claims 64, 65 and 66, wherein each keyswitch assembly corresponds to a respective character of a complete alphabet.

69. The keyboard device according to any one of claims 64, 65 and 66, wherein each keyswitch assembly corresponds to a respective one of a character of a complete alphabet and a numeral of a complete set of digits.

70. The keyboard device according to claim 67, wherein the complete alphabet includes 26 characters.

71. The keyboard device according to claim 67, wherein the complete alphabet corresponds to a roman alphabet.

72. The keyboard device according to claim 64, wherein the key pitch is proportional to an extension of the elastic belt.

73. The keyboard device according to claim 64, wherein each keyswitch assembly corresponds to a respective key of a keyboard set of operational keys including alphanumeric, symbolic and function keys.

74. The keyboard device according to claim 64, wherein an increase in key pitch between at least substantially all keys representing letters of an alphabet is substantially uniform at each position in which the keyswitch assemblies are configured to accept data entry.

75. The keyboard device according to claim 64, wherein each keyswitch assembly corresponds to a respective key of the keyboard device.

76. A keyboard device, comprising:
  a housing including components movable relative to one another to extend the housing from a contracted position to an expanded position;
  a plurality of keyswitch assemblies; and
  at least one belt attached to the components of the housing and stretchable between a contracted position and an expanded position, the keyswitch assemblies attached to the belt so that a key pitch between adjacent keyswitch assemblies is greater in the expanded position of the belt than in the contracted position of the belt, the components of the housing relatively rigid as compared to the elastic belt;
  wherein the keyswitch assemblies are configured to accept data entry in the expanded position of the belt and the contracted position of the belt.

77. The keyboard device according to claim 76, wherein the key pitch corresponds to a spacing between adjacent keys of the keyboard device.

78. The keyboard device according to claim 76, wherein the key pitch corresponds to a center-to-center distance between adjacent keys of the keyboard device.

79. The keyboard device according to claim 76, wherein an increase in key pitch between at least substantially all keys representing letters of an alphabet is substantially uniform at each position of a plurality of positions in which the keyswitch assemblies are configured to accept data entry.

80. The keyboard device according to claim 76, wherein each keyswitch assembly corresponds to a respective key of the keyboard device.

81. A keyboard device, comprising:
  a housing including components movable relative to one another to extend the housing from a contracted position to an expanded position;
  a plurality of keyswitch assemblies; and
  a plurality of belts attached to the components of the housing and stretchable between a contracted position and an expanded position, each belt corresponding to a respective row of keys of the keyboard device, the keyswitch assemblies attached to the belts so that a key pitch between adjacent keyswitch assemblies is greater in the expanded position of the belt than in the contracted position of the belt, the components of the housing relatively rigid as compared to the belts;
  wherein the keyswitch assemblies are configured to accept data entry in the expanded position of the belt and in the contracted position of the belt.

82. The keyboard device according to claim 81, wherein the key pitch corresponds to a spacing between adjacent keys of the keyboard device.

83. The keyboard device according to claim 81, wherein the key pitch corresponds to a center-to-center distance between adjacent keys of the keyboard device.

84. The keyboard device according to claim 81, wherein an increase in key pitch between at least substantially all keys representing letters of an alphabet is substantially uniform at each position of a plurality of positions in which the keyswitch assemblies are configured to accept data entry.

85. The keyboard device according to claim 81, wherein each keyswitch assembly corresponds to a respective key of the keyboard device.

86. A keyboard device, comprising:
  a housing including components movable relative to one another to extend the housing from a contracted position to an expanded position;
  a plurality of keyswitch assemblies; and
  at least one belt attached to the components of the housing and stretchable between a contracted position and an expanded position, the keyswitch assemblies movable in accordance with stretch of the belt so that a key pitch between adjacent keyswitch assemblies is greater in the expanded position of the belt than in the contracted position of the belt, the components of the housing relatively rigid as compared to the belt;
  wherein the keyswitch assemblies are configured to accept data entry in the expanded position of the belt and the compressed position of the belt.

87. The keyboard device according to claim 86, wherein each keyswitch assembly corresponds to a respective key of the keyboard device.

88. A keyboard device, comprising:
  a housing including components movable relative to one another to extend the housing from a contracted position to an expanded position;
  a plurality of keyswitch assemblies; and
  a plurality of belts attached to the components of the housing and stretchable between a contracted position and an expanded position, each belt corresponding to a respective row of keys of the keyboard device, the keyswitch assemblies movable in accordance with stretch of the belts so that a key pitch between adjacent keyswitch assemblies is greater in the expanded position of the belt than in the contracted position of the belt, the components of the housing relatively rigid as compared to the belts;

wherein the keyswitch assemblies are configured to accept data entry in the expanded position of the belt and in the compressed position of the belt.

89. The keyboard device according to claim 88, wherein each keyswitch assembly corresponds to a respective key of the keyboard device.

90. A keyboard device, comprising:
 a housing including components movable relative to one another to extend the housing from a contracted position to an expanded position;
 a plurality of keyswitch assemblies, each including a corresponding key top; and
 at least one belt attached to the housing components and stretchable between a contracted position and an expanded position, the keyswitch assemblies arranged with respect to the belt so that a key pitch between adjacent key tops is greater in the expanded position of the belt than in the contracted-position of the belt, the components of the housing relatively rigid as compared to the belt;
 wherein the keyswitch assemblies are configured to accept data entry in the expanded position of the belt and the contracted position of the belt.

91. The keyboard device according to claim 90, wherein the key pitch corresponds to a spacing between adjacent key tops of the keyboard device.

92. The keyboard device according to claim 90, wherein the key pitch corresponds to a center-to-center distance between adjacent key tops of the keyboard device.

93. The keyboard device according to claim 90, wherein an increase in key pitch between at least substantially all keys representing letters of an alphabet is substantially uniform at each position of a plurality of positions in which the keyswitch assemblies are configured to accept data entry.

94. The keyboard device according to claim 90, wherein each keyswitch assembly corresponds to a respective key of the keyboard device.

95. A keyboard device, comprising:
 a housing including components movable relative to one another to extend the housing from a contracted position to an expanded position;
 a plurality of keyswitch assemblies, each including a corresponding key top; and
 a plurality of belts attached to the housing components and stretchable between a contracted position and an expanded position, each belt corresponding to a respective row of keys of the keyboard device, the keyswitch assemblies arranged with respect to the belt so that so that a key pitch between adjacent key tops is greater in the expanded position of the belt than in the contracted position of the belt, the components of the housing relatively rigid as compared to the belt;
 wherein the keyswitch assemblies are configured to accept data entry in the expanded position of the belt and in the compressed position of the belt.

96. The keyboard device according to claim 95, wherein the key pitch corresponds to a spacing between adjacent key tops of the keyboard device.

97. The keyboard device according to claim 95, wherein the key pitch corresponds to a center-to-center distance between adjacent key tops of the keyboard device.

98. The keyboard device according to claim 95, wherein an increase in key pitch between at least substantially all keys representing letters of an alphabet is substantially uniform at each position of a plurality of positions in which the keyswitch assemblies are configured to accept data entry.

99. The keyboard device according to claim 95, wherein each keyswitch assembly corresponds to a respective key of the keyboard device.

100. An expandable and contractible keyboard comprising:
 a housing which is extendible substantially in a single plane from a contracted position to an expanded position;
 a supporting framework including components movable relative to one another to extend the supporting framework substantially in a single plane from a contracted position to an expanded position attached to the housing;
 a plurality of elastic belts attached to components of the supporting framework, the supporting framework having components relatively rigid as compared to the elastic belts; and
 a plurality of keyswitches mounted on the elastic belts;
 wherein the keyswitches are wired to provide an electrical response when a keyswitch is pressed.

101. The keyboard according to claim 100, wherein each keyswitch corresponds to a respective key of the keyboard device.

102. An expandable and contractible keyboard comprising:
 a housing which is extendible substantially in a single plane from a contracted position to an expanded position;
 a supporting framework including components movable relative to one another to extend the supporting framework substantially in a single plane from a contracted position to an expanded position attached to the housing:
 a plurality of elastic belts attached to components of the supporting framework, the supporting framework having components relatively rigid as compared to the elastic belts; and
 a plurality of keyswitches mounted on the elastic belts;
 wherein the keyswitches are conductively connected to a circuit to provide an electrical response when a keyswitch is pressed.

103. The keyboard according to claim 102, wherein each keyswitch assembly corresponds to a respective key of the keyboard device.

* * * * *